(12) United States Patent
Robinson et al.

(10) Patent No.: US 7,027,997 B1
(45) Date of Patent: Apr. 11, 2006

(54) FLEXIBLE WEB-BASED INTERFACE FOR WORKFLOW MANAGEMENT SYSTEMS

(75) Inventors: William Brewster Robinson, Foxboro, MA (US); Benjamin Hurwitz, Acton, MA (US); Jin Jing, Medfield, MA (US); Himanshu Shekhar Sinha, Acton, MA (US)

(73) Assignees: Verizon Laboratories Inc., Waltham, MA (US); Level 3 Communications, Inc., Broomfield, CO (US)

( * ) Notice: Subject to any disclaimer, the term of this patent is extended or adjusted under 35 U.S.C. 154(b) by 709 days.

(21) Appl. No.: 09/704,916

(22) Filed: Nov. 2, 2000

(51) Int. Cl.
*G06F 17/60* (2006.01)

(52) U.S. Cl. .................... 705/9; 717/103; 719/310; 709/218

(58) Field of Classification Search .................... 705/9; 707/103; 715/513, 516; 719/311
See application file for complete search history.

(56) References Cited

U.S. PATENT DOCUMENTS

| | | | |
|---|---|---|---|
| 5,892,905 A | 4/1999 | Brandt et al. | 395/187 |
| 5,930,512 A * | 7/1999 | Boden et al. | 717/102 |
| 6,289,382 B1 * | 9/2001 | Bowman-Amuah | 709/226 |
| 6,397,191 B1 * | 5/2002 | Notani et al. | 705/9 |
| 6,470,353 B1 * | 10/2002 | Yaung et al. | 707/103 R |
| 6,526,570 B1 * | 2/2003 | Click et al. | 717/146 |
| 6,574,675 B1 * | 6/2003 | Swenson | 719/316 |

FOREIGN PATENT DOCUMENTS

EP    1046985 A2 * 10/2000

OTHER PUBLICATIONS

Smith, Protocol Work Melds Storage Methods, Network World, Sep. 13, 1999, p. 67 [PROQUEST].*
MQSeries Workflow software © International Business Machines Corporation downloaded from http://www.-4.ibm.com/software/ts/mqseries/workflow/ Feb. 7, 2000.

* cited by examiner

*Primary Examiner*—Susanna M. Diaz
*Assistant Examiner*—Michael C. Heck
(74) *Attorney, Agent, or Firm*—Leonard C. Suchtya, Esq.; Joel Wall, Esq.; Radar, Fishman, & Grauer PLLC

(57) ABSTRACT

A flexible interface and a method for employing the same are provided for interconnecting a client program with a workflow server running a workflow management system having workflow-type functionality. The interface includes a set of predefined protocol user interface pages including at least one control page. At least one first workflow platform-dependent object is provided for accessing the workflow functionality. At least one second workflow platform-independent object is provided for providing data to the first workflow platform-dependent object. At least one server program is provided that is callable by the control page to access the workflow functionality by invoking at least one of the first workflow platform-dependent object and the second workflow platform-independent object to promote data translation and exchange between the client program and the workflow management system.

72 Claims, 21 Drawing Sheets

FLEXIBLE WEB-BASED INTERFACE FOR WORKFLOW MANAGEMENT SYSTEMS

BACKGROUND OF THE INVENTION

1. Technical Field

This invention relates generally to a flexible web (HTML) based interface for accessing workflow information stored on a workflow management system without requiring an application-specific client to be deployed to individual users.

2. Discussion of the Related Art

Workflow management systems (WFMSs) are becoming more commonplace in the work environment as business processes become increasingly complex. Businesses use workflow management software to plan and manage activities and resources involved in getting its business tasks done timely and accurately. The workflow management software also allows these businesses to track its flow of work.

Workflow management software allows businesses to automate their processes that can save an organization time and money by presenting the right activity to the right person at the right time, supported by the information and the programs to perform the activity. Workflow management software also allows an administrator of the business to define and document models of business processes. Once these models are assigned, the administrator can create "instances" of the defined process, assign staff members to the activities in the process instances, and associate applications with particular activities.

In addition to the administrative side, workflow management software also allows users/employees to start "instances" of the pre-defined processes, manage these instances, start activities scheduled by the running instances, transfer responsibility for completing certain activities from one user to another, and tracking process instances and the status of activities assigned to users/employees.

A schematic of a workflow management system, referred to with reference numeral 10, is shown in FIG. 1. The workflow management system 10 typically includes a table 12 of process templates (shown by example as records $PT_1$, $PT_2$ and $PT_3$ of the process template table 12. The workflow management system 10 also typically includes a table 14 of users (shown by example as records $User_1$, $User_2$ and $User_3$) of the process template table 12.

Each of the tables 12 and 14 are provided as inputs to define "work" 16 of a particular company or organization as essentially a worklist formed of several instances of processes defined in the process template table 12 as assigned to particular employees of the company defined in the users table 14. This work 16 is shown by a table 18 of initiated process instances $PI_1$, $PI_2$ and $PI_3$, which, as shown in FIG. 1, are based upon various process templates as defined in the process template table 12. As shown in the example of FIG. 1, the process instances $PI_1$, $PI_2$ and $PI_3$ are based on process templates $PT_2$, $PT_2$ and $PT_3$, respectively.

Each of the records of the process instance table 18 includes a series of tasks to be completed by a particular user (the specific tasks of a process instance are defined in each process template in the table 12). The work 16 of the company can thereby be assessed by examining a particular process instance. In FIG. 1, a table 20 shows the particular tasks $Task_1$, $Task_2$ and $Task_3$ of process instance $PI_3$ that are, by example, happen to be assigned to users $User_1$, $User_1$ and $User_3$, respectively.

By filtering or querying the process instance table 18 and the sub-records thereof (one of which is shown by example by process instance $PI_3$ table 20), a user can obtain his/her worklist of tasks (of any process instance) assigned to him/her. Table 22 shows this filtered worklist for $User_1$ who has $Task_1$ and $Task_2$ assigned thereto from process instance $PI_3$. Other worklists for other users (such as for $User_2$ shown by table 24) can be obtained simply by querying the WFMS tables 18 and 20 with different criteria.

One example of workflow management software is the MQSeries WorkFlow application available from IBM, which integrates tasks performed, by computer applications with the everyday tasks of staff members. Other examples of suitable workflow management software applications include jFlow available from Workflow Automation Corporation, and Verve available from Verve, Inc.

In the past, workflow management software packages were typically defined to run within a self-contained local area network. A problem with such workflow servers is that processes defined for one workflow server product cannot be run on a different workflow server or client without a specialized application program interface (API) designed especially for the particular WFMS. The API, specialized client software, must be installed on each of the machines on a local-area network—making it difficult to manage workflow over wide-area networks.

Further, even if a common access client (such as a web browser) was employed, web-based browsers cannot employ the full functionality of the workflow management system, such as employing an access tool such as an ActiveX control for the API of the workflow management software) since the code for the API is "closed source."

Web-based interfaces for WFMS have proven difficult to adapt to specific company processes—and typically require extensive programming (such as using proprietary HTML extensions in user-defined input pages specifically designed for a particular WFMS package). The time and cost investment required to design and implement such a package often is too much for a company to absorb.

Prior art web interfaces for WFMS are also not easily customizable due to the large amount of programming needed to adapt a particular web-based interface for a particular workflow management system. Also, programmers would be required to know about coding-specific issues to interact with a particular workflow management software package. Further, even if a company were successful in designing a particular web-based interface for a workflow management system, it would be extremely difficult to adapt the web-based interface if the company were to change workflow management platforms since the commands needed to access the functionality of the web-based interface are embedded in the custom-designed web pages.

There is therefore a need to provide a system and method for accessing a workflow management system via a common interface, such as a web browser, that minimizes or eliminates one or more of the shortcomings described above.

SUMMARY OF THE INVENTION

The web-based interface for a workflow management system overcomes the limitations of prior art interfaces by providing an easily customizable and intuitive access to the functionality of a workflow management system through a common interface, invokable through a web browser.

The interface comprises a set of front-end control pages that interact with a particular (OEM) workflow management system (referred to hereafter as "WFMS") via a set of servlets that act as a bridge between the common interface (the control pages) and a particular WFMS. The servlets, which can comprise a set of custom Java classes, separate the specifics for operating the WFMS from user operation. Thus, users can access virtually the full functionality of the WFMS through the web interface without requiring specific knowledge of how to operate the WFMS.

The interface is easily customizable for administrators of a WFMS with minimal web programming, i.e., activity user interface pages for collecting specific inputs required by the WFMS to instantiate or specify parameters for a particular process can be done with basic HTML tags and minimal web-language programming.

The interface described herein uses standardized programming code that eliminates the need for administrators or users to have special knowledge internal to the WFMS. That is, the servlets/custom classes described herein provide the interaction with WFMS—the programmer only need know what to provide as parameters to the custom classes. Thus, should a company desire to move between WFMS platforms, this can be done with minimal redesign of the system. This is accomplished by an inventive "bridge" that interfaces a client with a WFMS by programming objects including a first set of WFMS-specific objects and a second set of WFMS-independent objects which thereby allow a user/administrator to interface with the WFMS without having a great deal of internal WFMS-specific knowledge.

In one embodiment, the invention comprises a flexible interface employing a client program interconnected to a client server which, in turn, is operably networked to a workflow server running a workflow management system having workflow-type functionality. The workflow-type functionality includes a set of predefined process templates defining a set of tasks and being capable of monitoring workflow, assigning tasks to users, and allowing users to perform tasks and to initiate instances of a process from one of the set of predefined process templates.

The inventive interface comprises a set of predefined protocol user interface pages comprising at least one control page with said predefined protocol having at least one client server-side script embedded therein. At least one first workflow platform-dependent object is preferably provided for accessing the workflow functionality. At least one second workflow platform-independent object is preferably provided for providing data to the at least one first workflow platform-dependent object. The interface further preferably comprises at least one server program that is callable by the at least one control page and adapted to invoke at least one of the first workflow platform-dependent object and the at least one second workflow platform-independent object.

Thus, when the functionality of the workflow management system is to be accessed via the set of predefined protocol user interface pages, the at least one control page thereby calls the at least one server program which, in turn, invokes at least one of the first and second objects to promote data translation and exchange between the client program and the workflow management system.

In various sub-embodiments of the invention, the server program can further comprise a Log On servlet for receiving a user identification variable and a password variable from one of the set of predefined protocol pages and invoking at least one of the first and second objects to authenticate the user identification variable with the workflow management system.

The server program can further comprise an Activity servlet for receiving a work item identification and a target user interface address from the at least one control page, and invoking at least one of the first and second objects to record lock a task in the workflow management system corresponding to the work item identification and permit exclusive access by a user to the task identified by the work item identification. The Activity servlet can also further comprise a redirection command for navigating the user to a predefined protocol page represented by the target user interface address for performing work on the task identified by the work item identification.

The server program can also further comprise a Check In servlet for receiving a work item identification from one of an activity user interface page and the at least one control page, and invoking at least one of the first and second objects to release a record lock on a task in the workflow management system corresponding to the work item identification and terminate any exclusive access by a user to the task identified by the work item identification. The Check In servlet can further receive task-specific data from a requesting page and can preferably further comprise a database update command for updating the task identified by the work item identification with the task-specific data.

The server program can further comprise a New Instance servlet for receiving a predefined process template identification from the at least one control page, and invoking at least one of the first and second objects to initiate a new instance of a process template in the workflow management system corresponding to the process template identification. The New Instance servlet can determine whether input data is needed to initiate the new instance of the predefined process template and the interface can further comprise a user interface page face wherein the New Instance servlet redirects the user to the user interface page to further receive input data to properly initiate the new instance of the process template with the input data.

At least one predefined protocol user interface page can be provided that is adapted to receive at least one data variable from the user and to call the at least one server-based applet. The user interface page can further comprise at least one <FORM> tag having at least one input element for receiving data from the user. The user interface page is adapted to provide at least one data variable to initiate a process template into a running process that requires the data entry for instantiation. The user interface page can be adapted to provide at least one data variable to complete a task from a previously initiated process that requires the data entry for completion.

The first and second objects can be Java classes. More specifically, the first and second objects can be Java interfaces. The at least one control page can comprise a variety of pages including the following: a worklist page, a process instance page, a process template page, a work item control page, a filter control page, and a notifications page. The client program can be a web browser and the client server can be a web server.

In another embodiment, the invention comprises a method for employing a flexible interface of a client program interconnected to a client server to access the functionality of a workflow management system operably networked to a workflow server, the functionality including a set of predefined process templates defining a set of tasks and being capable of monitoring workflow, assigning tasks to users, and allowing users to initiate instances of a process from one of the set of predefined process templates, the method comprising the steps of: configuring a set of predefined protocol user interface pages comprising at least one control page with said predefined protocol having at least one server-side script embedded therein; pointing at least one first workflow platform-dependent object to access the workflow functionality; interfacing at least one second workflow platform-independent object with the at least one first workflow platform-dependent object; and calling at least one server program with the at least one control page which thereby invokes at least one of the first workflow platform-dependent object and the at least one second workflow platform-independent object; wherein, when the functionality of the workflow management system is to be accessed via the set of predefined protocol user interface pages, the at least one control page calls the at least one server program which, in turn, invokes at least one of the first and second objects to promote data translation and exchange between the client program and the workflow management system.

In various sub-embodiments of the method, the method can also include the steps of: logging a user on to the workflow management system via one of the set of predefined protocol pages, receiving a user identification variable and a password variable therefrom, and invoking at least one of the first and second objects to authenticate the user identification variable with the workflow management system; receiving a work item identification and a target user interface address from the at least one control page; and invoking at least one of the first and second objects to record lock a task in the workflow management system corresponding to the work item identification; issuing a redirection command to a predefined protocol page represented by the target user interface address for performing work on the task identified by the work item identification; receiving a work item identification from the at least one control page and invoking at least one of the first and second objects to release a record lock on a task in the workflow management system corresponding to the work item identification and terminate any exclusive access by a user to the task identified by the work item identification; receiving task-specific data from a requesting page and updating the task identified by the work item identification with the task-specific data in the workflow management system; receiving a predefined process template identification from the at least one control page, and invoking at least one of the first and second objects to initiate a new instance of a process template in the workflow management system corresponding to the process template identification; determining whether input data is needed to initiate the new instance of the predefined process template; redirecting the user to a user interface page to receive required input data to properly initiate the new instance of the process template with the input data if the determining step results in a determination that data is needed to initiate the process instance; and redirecting the user from the user interface page back to the New Instance servlet to update the workflow management system with the received input data to initiate the process instance.

In additional embodiments of the invention, at least one predefined protocol user interface page can be provided that is adapted to receive at least one data variable from the user and to call the at least one server-based applet. The user interface page can further comprise at least one <FORM> tag having at least one input element for receiving data from the user. The user interface page can be adapted to provide at least one data variable to initiate a process template into a running process that requires the data entry for instantiation. The user interface page can be adapted to provide at least one data variable to complete a task from a previously initiated process that requires the data entry for completion.

In another aspect, the invention relates to a method for organizing and locating and navigating users within a flexible interface of a client program interconnected to a client server having a predefined interface root directory path to access the functionality of a workflow management system. The workflow functionality includes a set of predefined process templates each having a unique process identifier and defining a set of tasks and being capable of monitoring workflow, assigning tasks to users each having a unique task identifier, and allowing users to initiate instances of a process from one of the set of predefined process templates. Specifically, the method comprising the steps of creating at least one predefined protocol process activity page relating to a process and named for the unique process identifier; locating the at least one predefined protocol process activity page in the predefined interface root directory path; creating a process directory beneath the predefined interface root directory path for the process and named for the unique identifier thereof; creating at least one predefined protocol user interface page within the created process directory in a predetermined protocol relating to a task assignable within the process named for the task unique identifier if the process requires input on any of its assignable activities; locating the at least one predefined protocol user interface page in the created directory within the predefined interface root directory path; whereby the predefined protocol process activity page can be automatically located by the interface within the predefined interface root directory path of the client server by only knowing the process unique identifier and the at least one predefined protocol user interface page can be located in the created directory within the predefined interface root directory path by knowing only the task unique identifier.

In various embodiments of the invention, the method can also include the step of embedding a form within the at least one user interface page in the predefined protocol configured so as to provide any required data to the assignable task into the workflow management system. The form can contain input prompts configured so as to provide specific data in a machine-readable format to the workflow management system. In addition, the method can also comprise the step of embedding a hidden field on the at least one user interface page containing the unique process identifier for cross-referencing the data within the at least one user interface page with the workflow management system. The predefined protocol can comprise at least one of HTML and javascript. Further, the method can comprise the step of defining a programming object for use as an input container for delivering data entered by a user on the at least one user interface page.

Other objects, features, and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
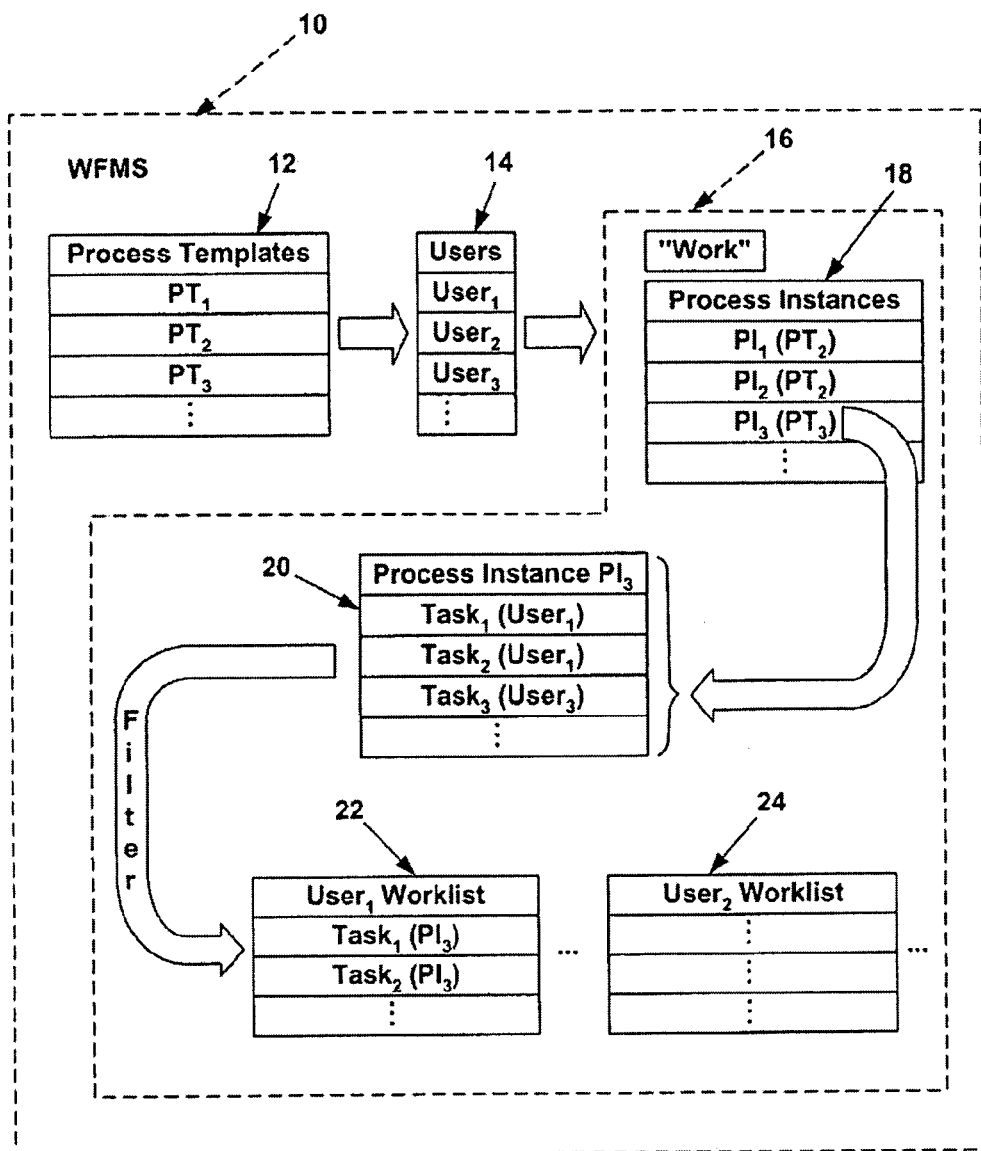
FIG. 1 is a schematic view of a typical workflow management system including various tables for process templates, user data and process instances.
Figure 2:
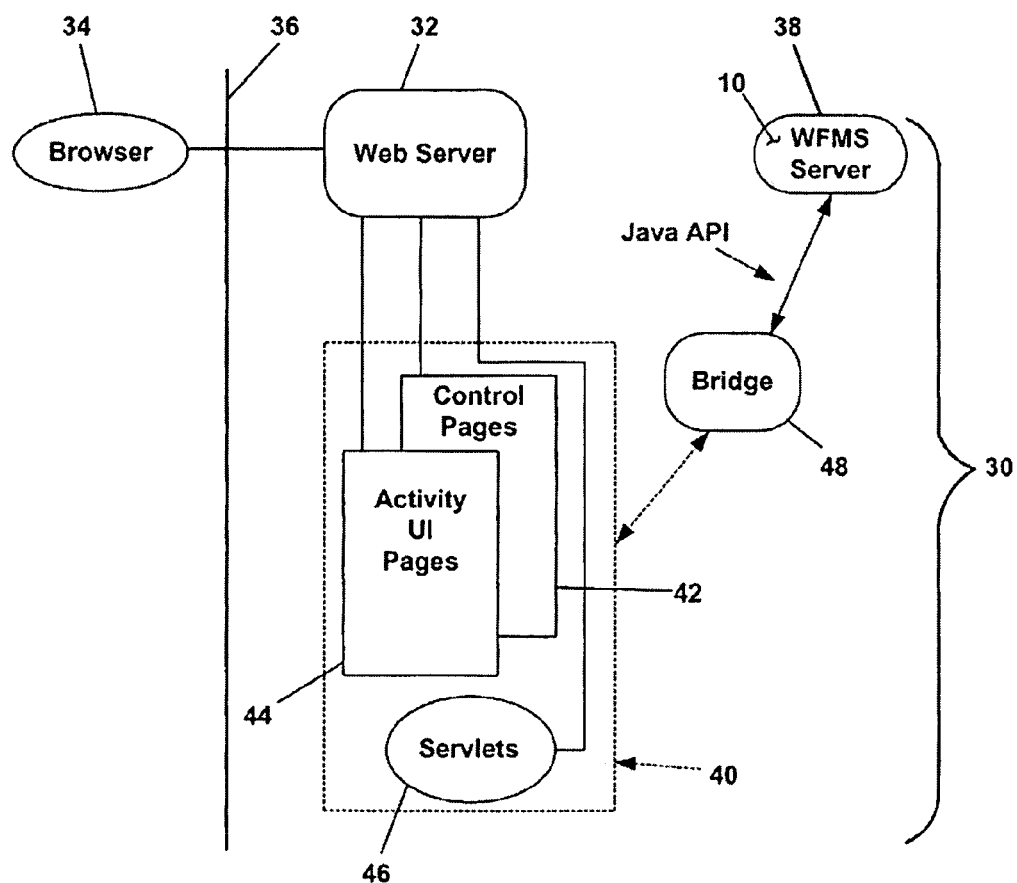
FIG. 2 is a schematic view of a wide area network including a web server, a web client, a workflow management server and a web-based interface for the workflow management system according to the invention.

Referring now to the drawings wherein like reference numerals are used to identify identical components in the various views, FIG. 2 shows a schematic view of a wide area network 30 including a web server 32 interacting with a web client 34 through a firewall 36. It will be understood that the web server 32 has all necessary installations of web and web site management software to enable the web server 32 to execute code thereon and generate context-specific HTML pages to the web client 34. Further, although the web client 34 is shown located outside the firewall 36, the web client 34 could be deployed inside the firewall, such as an intranet client, as well. In fact, the firewall 36 is merely illustrated to show that the web client 34 can be located outside the confines of the network 30 without being limiting to the invention.

A workflow management server 38 is provided on the network 30 that is running an operational version of an OEM-based platform- and company-specific version of a WFMS 10. It will also be understood that the particular title and/or brand of WFMS is not limiting on the scope of this invention and any WFMS can be employed without departing from the scope of this invention.

The web server 32 has a web-based interface 40 for the WFMS 10 according to the invention which comprises a set of control pages 42, activity user interface pages 44 and server-side applications (web servlets) 46 which cooperate to act as a bridge 48 between the specific interaction with the particular WFMS 10 employed on the WFMS server 38 and the common user interface (web browser) employed by the web client 34.

Figure 3:
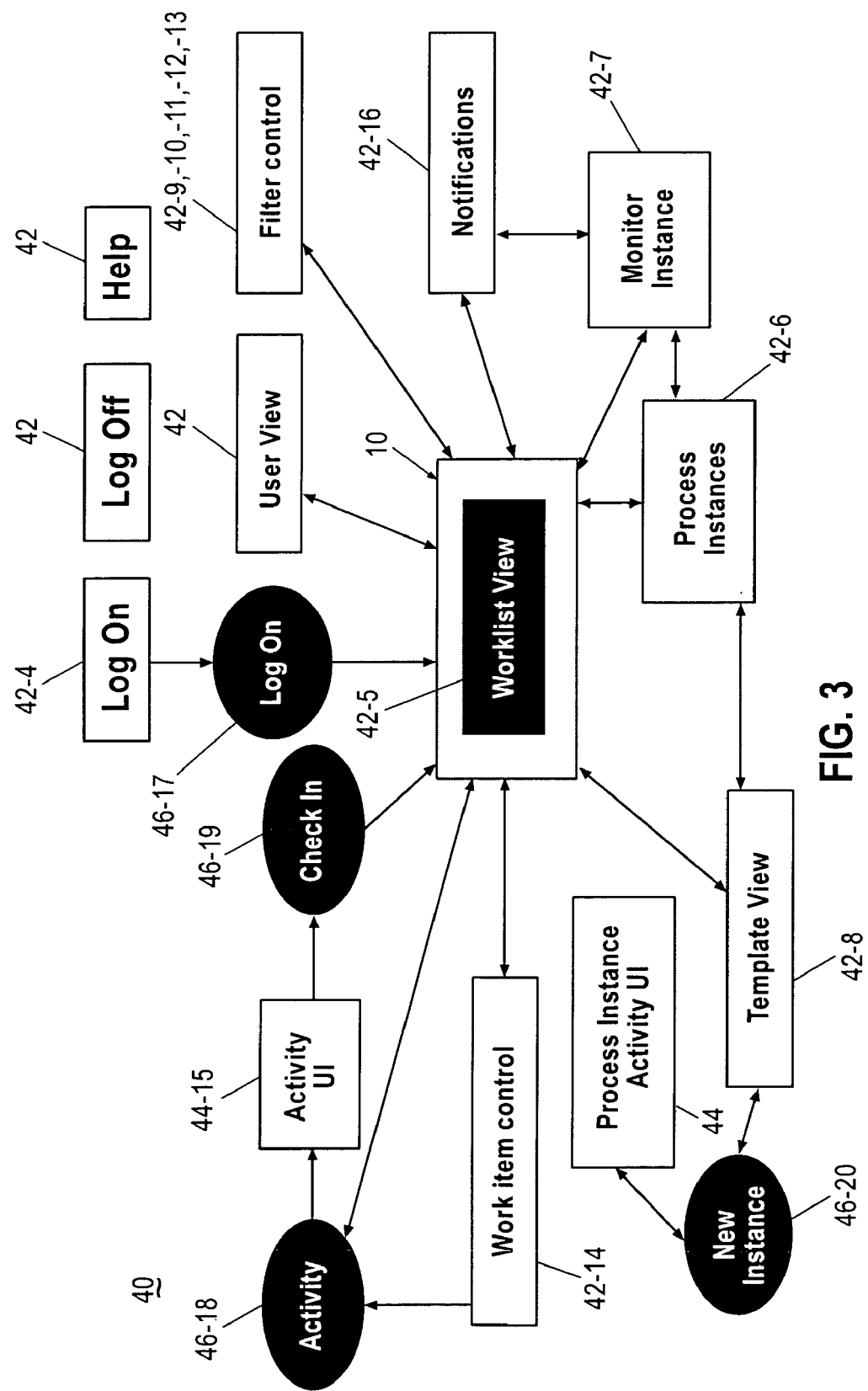
FIG. 3 is a schematic view of the web-based workflow management system of FIG. 2 including control pages, activity user interface pages and servlets/custom classes therefor.

Turning to FIG. 3, the interface 40 is shown in greater detail and illustrates the interaction of a worklist contained in the WFMS 10 located on the WFMS server 38. Many points of interaction are shown in FIG. 3 between the WFMS 10 and the interface 40. These types of interactions will be described with reference to the schematic map of FIG. 3 and with further reference to the pictorial examples of the control pages 42 shown in FIGS. 4–13, the example of an activity user interface page shown in FIG. 14 and with regard to the following description of the servlets 46 dispersed throughout.

For ease of reference, the web pages and servlets are referenced by their general type (i.e., control page 42) followed by a hyphen and terminated by the figure in which the web page is described in detail. For example, the log on control page is referred to as 42-4 meaning that the log on page is a control page 42 described in FIG. 4.

The control pages 42 are designed to access the underlying functionality of the particular WFMS 10 on the WFMS server 38 with the servlets 46 to act as the bridge 48 for a user. Through the control pages 42 and the servlets 46, a user can access their worklist and handle activities associated therewith, review the process template table, and review and/or initiate particular process templates into process instances.

Turning to FIGS. 4–16 in connection with the following description of the control pages 42, it should be noted that the interface 40 includes efficiency-enhancing features such as a quick navigation frame 50 at an upper portion of each of the control pages 42 having links which perform such functions as logging a user into and out of the WFMS 10 (see FIG. 4), immediately jumping to a user's worklist (see FIG. 5), and providing context-specific access to online help instructions (not shown herein).

The interface 40 preferably includes at least a first frame 52 and a second frame 54, as used in web-related parlance to mean a portion of the web client 34 window divided whereby the contents of one frame can be scrolled without affecting the contents of another frame. The first frame 52 is preferably always in view as it identifies the web client 34 and includes the quick navigation frame 50. The second frame 54 is optionally included in the interface 40 and its specific appearance is described below with reference to the specific descriptions of the control pages 42. With regard to FIGS. 4–16, it can be seen that the first frame 52 is visible in all appearances of the web client 34, however, the second frame 54 is available in selected control pages 42.

Figure 4:
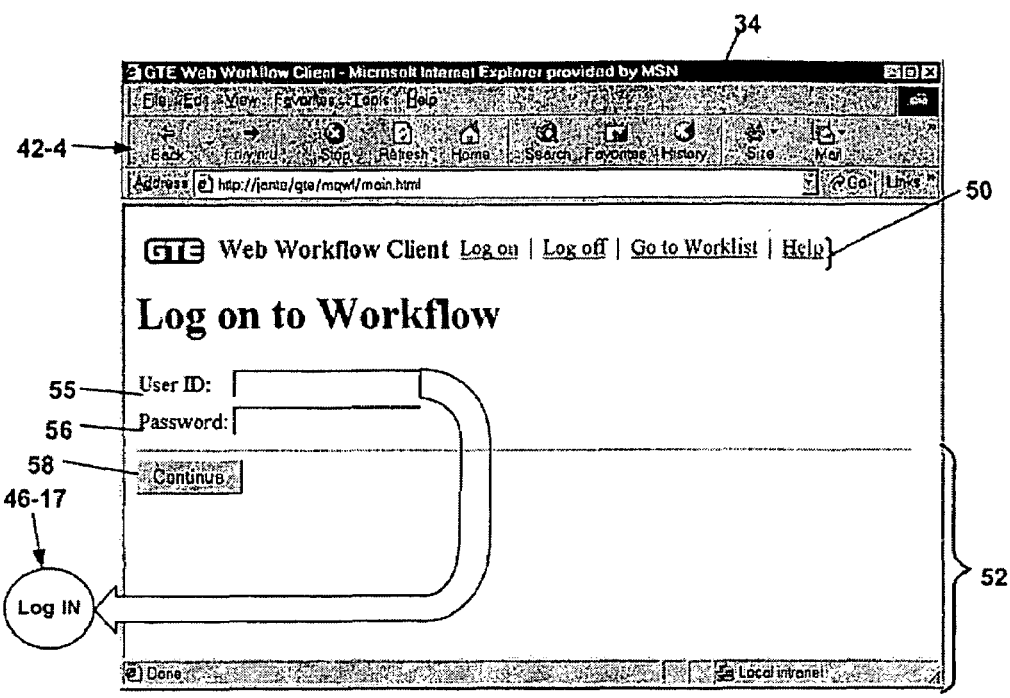
FIG. 4 is a control page as shown in FIG. 3 for logging on to the workflow management system to obtain authorization to operate therein.

Turning to FIG. 4, a control page 42-4 is for logging on to the workflow management system to obtain authorization to operate therein. A user typically must request authorization from the WFMS 10 to authenticate their rights as an authorized user of the WFMS 10. This is done in the log on control page 42-4 via "User ID" and "Password" text boxes 55 and 56, respectively. Of course, any input control, e.g., drop down select menus, etc., can be employed to obtain this information without departing from the scope of this invention. Once these items are entered, the user clicks on a Submit-type button 58 (shown in FIG. 4 as "Continue") to send the authentication information to the WFMS 10.

The authentication information entered in the text boxes 55 and 56 are then submitted to a Log On servlet 46-17.

Figure 17:
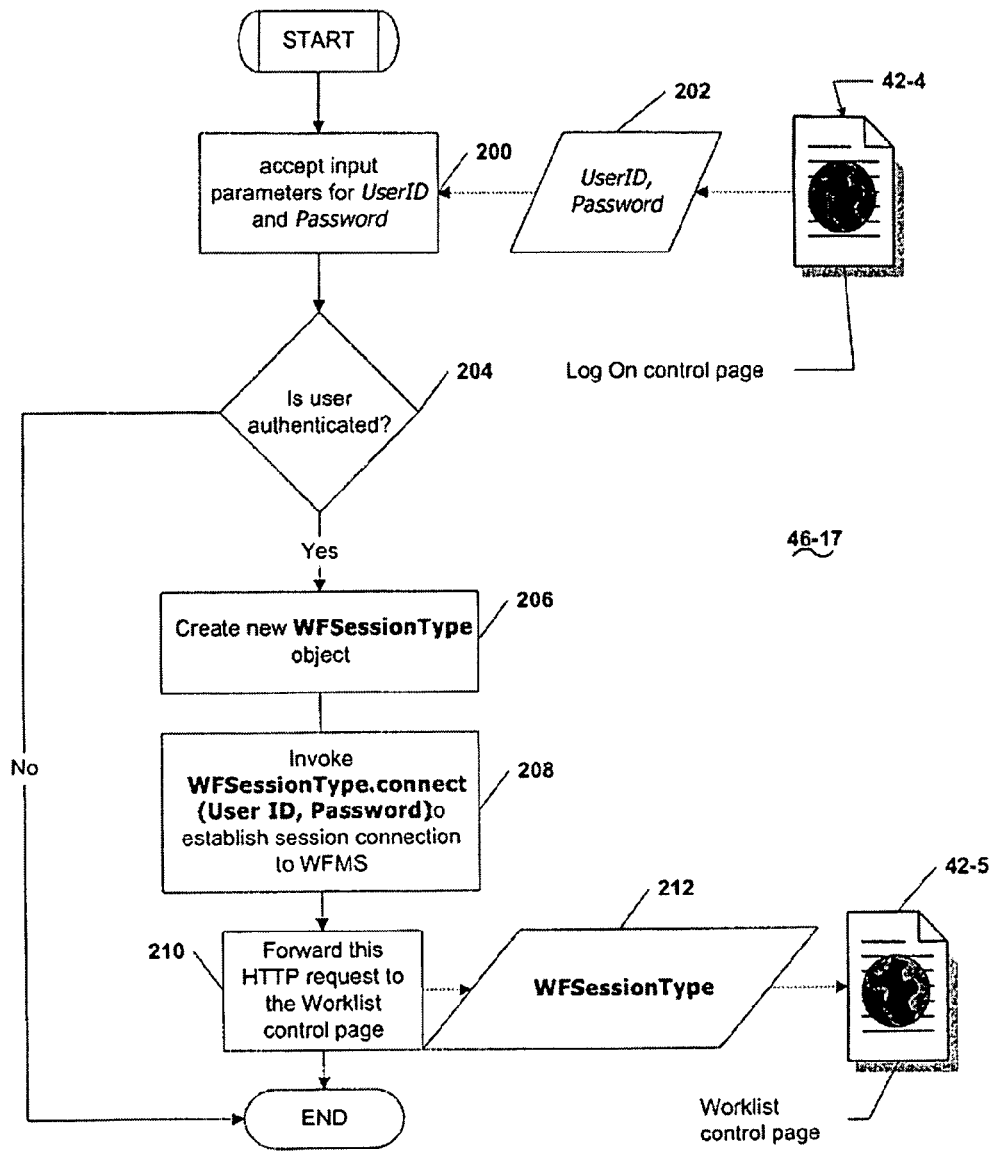
FIG. 17 is a flowchart detailing the structure, function and operation of a Log On servlet typically called by the log on control page described with respect to FIG. 4.

The Log On servlet 46-17, described in greater detail with respect to FIG. 17, accepts the UserID and Password information sent with the submission of form data contained in the elements 55 and 56 (as activated by the Submit button 58) from the log on control page 42-4 and creates and initializes an instance of a WFMS-specific workflow session custom class—in this case, referred to generally as WFSessionType. This WFSessionType class serves as an entry point to all needed WFMS-specific functionality that will be programmatically invoked by the Web Client during a typical HTTP session. The instance of WFSessionType thus created is shared by all of the control pages described herein, limiting the need for reauthentication to time-out intervals.

To limit the amount of memory the web server 32 must reserve for each session connection by users, instances of WFSessionType intentionally have very few instance variables, storing only the minimal number required to obtain access to the WFMS 10 functionality and a few others that represent a small amount of cached data.

This process of logging on establishes a session on the web server 32 for serving the web client 34 and another simultaneous session between the web client 34 and the WFMS server 38 for the logged on user's access to the WFMS 10. Both sessions typically have expiration periods whereby a user will be automatically logged out of both the web server 32 and the WFMS server 38 after a predetermined period of time.

Figure 5:
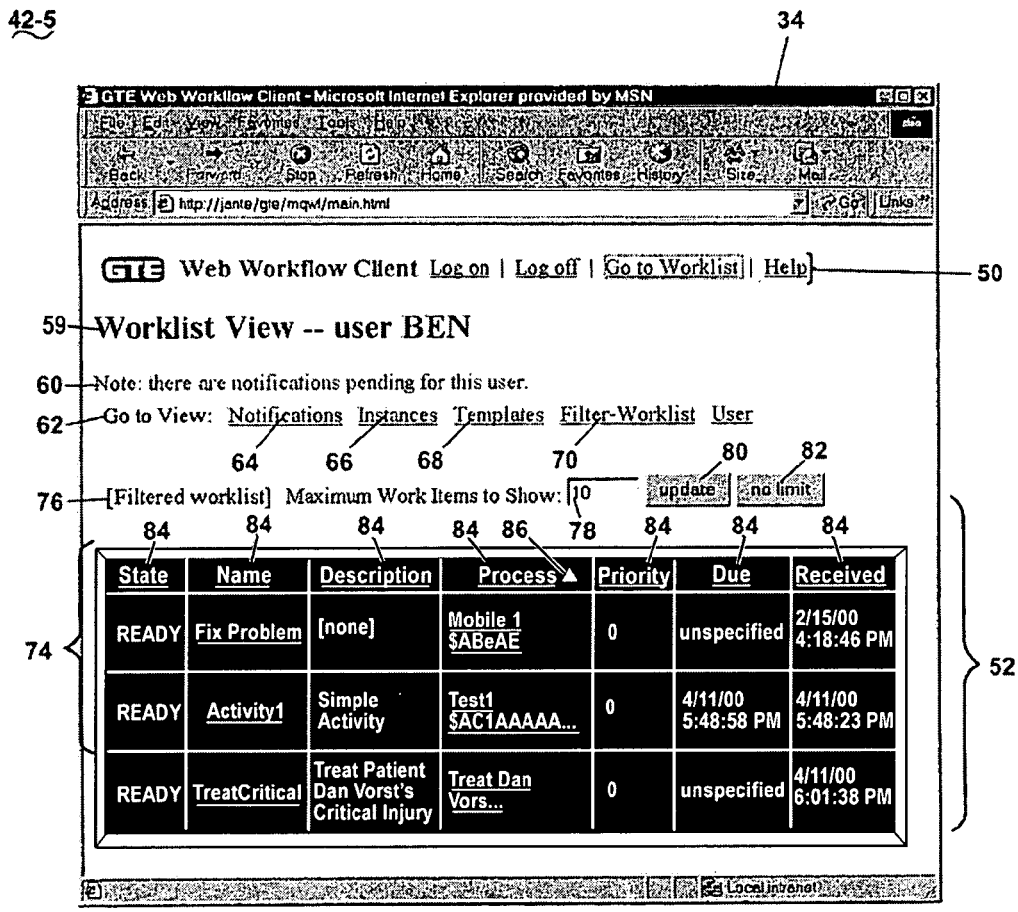
FIG. 5 is a control page as shown in FIG. 3 for displaying a user's current worklist after the user has obtained authorization from the workflow management system by logging in using the control page of FIG. 4.

After the user has successfully authenticated itself to the WFMS 10 via the Log On servlet 46-17, the interface 40 navigates the user to a filtered worklist control page 42-5 as shown in FIG. 5.

The worklist control page 42-5 is a main focus page of the interface 40. A title 59 identifies the user ID that was successfully logged in on control page 42-4. An alert area 60 can be provided beneath the title 59 for providing informational messages to a user about accessing particular areas of the interface 40. A second navigation bar 62 is provided beneath the alert area 60, which includes a series of links for efficiently accessing other important areas of the WFMS 10.

Examples of links provided in the second navigation bar 62 include a Notifications link 64 which can jump to a notifications control page 42-16 providing the user with informational messages. The Notifications link 64 is deactivated, i.e., displayed as unclickable plain text (or not displayed at all), if there are no notifications for the logged-on user. An Instances link 66 can jump the user to an instances control page 42-6 describing running instances of processes (such as that shown in FIG. 6). A Templates link 68 can jump the user to a templates control page 42-8 describing the process templates accessible to the user (such as that shown in FIG. 8). A Filter Worklist link 70 can jump the user to a worklist-filter control page 42-9 allowing sub-querying and filtering of the work available to the user (such as that shown and described with respect to FIGS. 9–13).

A worklist 74 for the authenticated user is shown thereebeneath in table form having several columns denoting information available from the WFMS 10 and several rows denoting the particular work items in the worklist 74.

A status line 76 is provided above the worklist 74 that contains information about the worklist 74, namely, whether the information in the worklist 74 has been filtered, and whether there is any preset limit on the number of rows visible in the worklist 74.

The limit on the number of items visible in the worklist 74 can be controlled by the user. It should be noted that this limit does not control the physical number of items available to the user, but rather the number of these items visible in the table representing the worklist 74. The user can enter an integer number, preferably greater than zero, to restrict the maximum number of worklist items (i.e., rows in the table representing the worklist 74). This is accomplished by entering an integer number num in a text box 78 and pressing an "update" button 80, which thereafter queries the WFMS 10 and retrieves the first num items from the WFMS 10 in a predetermined sort order. A "no limit" button 82 is contemplated as well which removes the limit of num items from the worklist and displays all work items attributable to a user in the worklist table 74.

The limit feature afforded by the text box 78 and the update button 80 is useful when a user has a worklist containing a large number of work items but a user does not desire to see all of the worklist items at once.

The worklist table 74 is a common feature shown on many of the control pages 42 in various forms. As described above, the worklist table 74 shows work items (attributable to the logged in user in the version shown on control page 42-5), one work item per row of the table 74. It is an important inventive feature of the interface 40 that column headings 84 of the worklist table 74 are preferably provided as clickable hyperlinks whereby, when a user clicks a particular column heading 84, the worklist table is sorted by the data in that column. Clicking again on the same column heading 84 sorts the column in the reverse direction.

This sorting applies to all of the worklist items contained in the particular user's worklist, and is applied before any imposed limit (i.e., the first num items in the text box 78). Thus, consecutive sorts on different column headings 84 can show different items in the table 74, if a user's choice of the number num of maximum work items is less than the total number of items in the user's worklist.

It should be noted that a flag 86 is placed in the particular column heading 84 by which the sort is performed. For example, in the example shown in FIG. 5, an up arrow is shown adjacent to a "Process" column heading 84, signifying that an ascending sort has been performed relative to the "Process" column. A visual inspection of the data in the "Process" column shows the data is indeed sorted by this column. A down arrow could be used for the flag 86 to show a sort in descending order.

The worklist table 74 shows various types of important information that the interface 40 receives from the WFMS 10. As described above, each row of the worklist table 74 represents one work item. Various data are described in the worklist table 74 with respect to each work item row thereof, such as "State", "Name", "Description", "Process", "Priority", "Due", and "Received" column headings 84. Of course, these column headings can vary in specific implementations of a WFMS for the interface as the interface has been customized by an administrator.

It is another important feature of the interface 40 that, besides the hyperlink nature of the column headings 84, which results in the sorting of the clicked column heading, the actual data entries beneath the column headings 84 are converted to hyperlinks in the interface 40 as well.

For example, the "State" column displays the state of each listed work item, which can have various values such as READY, CHECKED OUT and RUNNING. The control page 42-5 thereby displays all READY values in the "State" column of worklist items as regular text. However, for any State values equal to RUNNING or CHECKED OUT, the control page 42-5 displays these values as hyperlinks which, when clicked, jump a user to a worklist item control page (see control page 42-14 in FIG. 14) to allow a user to modify that parameter of the worklist item with a single click of the mouse.

Another example can be shown with reference to the "Name" column heading 84, which shows the name of the activity for the work item. The interface can display selected names in this column as hypertext links that, when clicked, jump a user to a web page containing a form that prompts the user for information to complete the clicked-upon activity (e.g., see activity user interface page 44 in FIG. 15). Once the activity is completed, the user is returned to the worklist control page 42-5.

Yet a further example of the efficiencies created by the hypertext-link data items created by the interface 40 can be found with respect to the "Process" column heading 84 which shows the process instance that the work item relates to. The interface 40 can display selected process instance names as hypertext links that, when clicked, jump a user to a web page containing a workflow monitor information page which shows information about that process instance (see control page 42-7 in FIG. 7).

In these examples, a user need merely view the worklist table 74 on the worklist control page 42-5 and can navigate to all relevant information on the data items contained in the worklist table 74 by a single click of the mouse on the data items created as hypertext links therein.

Figure 6:
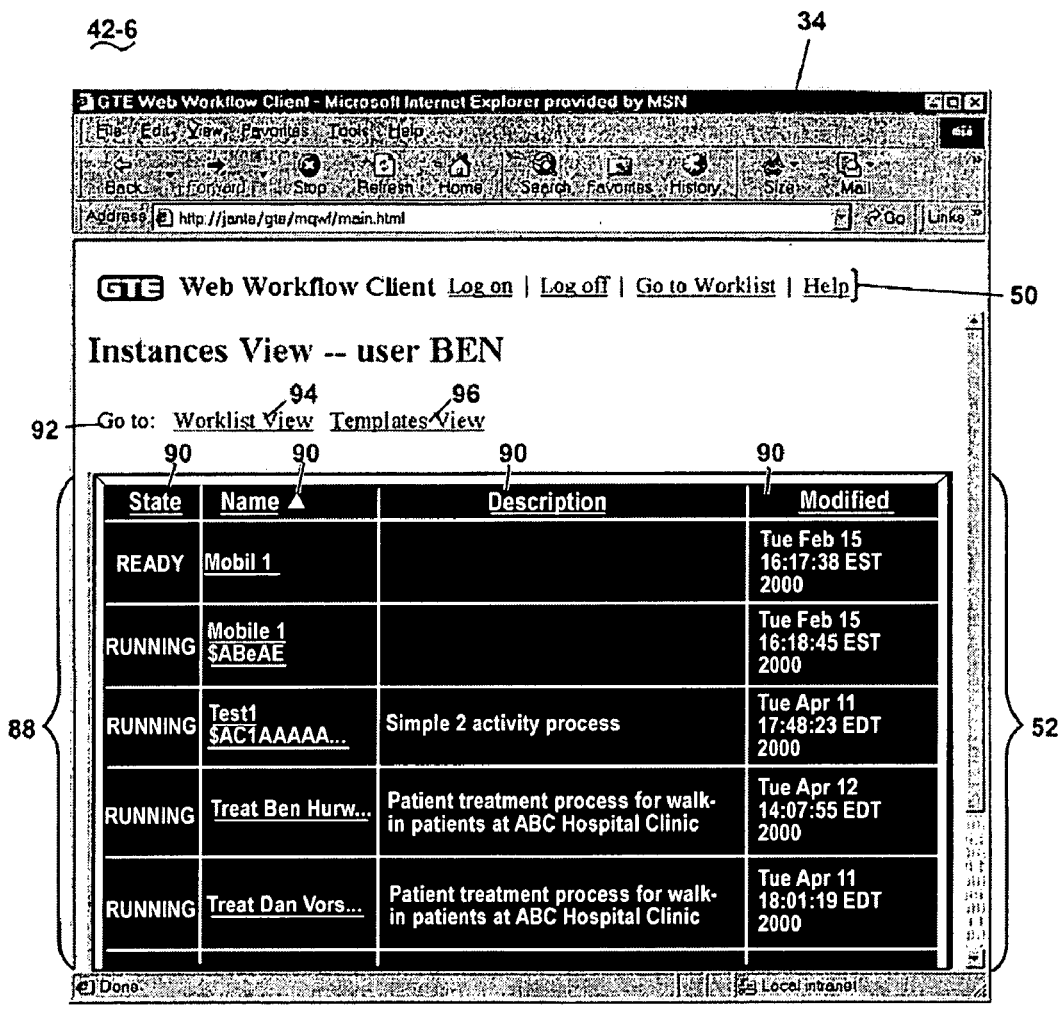
FIG. 6 is a control page as shown in FIG. 3 for displaying all active process instances.

Turning to FIG. 6, a control page 42-6 is provided that shows information in a table 88 about all running process instances (shown as rows in the table 88) that the user is authorized to view. The control page 42-6 is preferably easily navigable by a user and can be displayed easily, such as by clicking Instances link 66 on the worklist control page 42-5 as previously described. The Instances table 88 can be sorted by clicking on column headings 90 thereof in the same manner as previously described. Also, the data entries in the table 88 can also be converted to hypertext links in the same manner as previously described whereby, for example with reference to the "Name" column, a user can click on data entries in the rows and jump to another page/application for further information or work item processing. For example, clicking on a hypertext link created in the "Name" column navigates the user to the workflow monitor information control page 42-7 which shows information about the specific process instance clicked upon.

The Process Instances control page 42-6 can also include a navigation bar 92, which provides a Worklist View link 94 and a Templates View link 96. The Worklist View link 94, when clicked, jumps the user back to the worklist control page 42-5. The Templates View link 96, when clicked, jumps a user to the templates control page 42-8 (shown and described with respect to FIG. 8).

Figure 7:
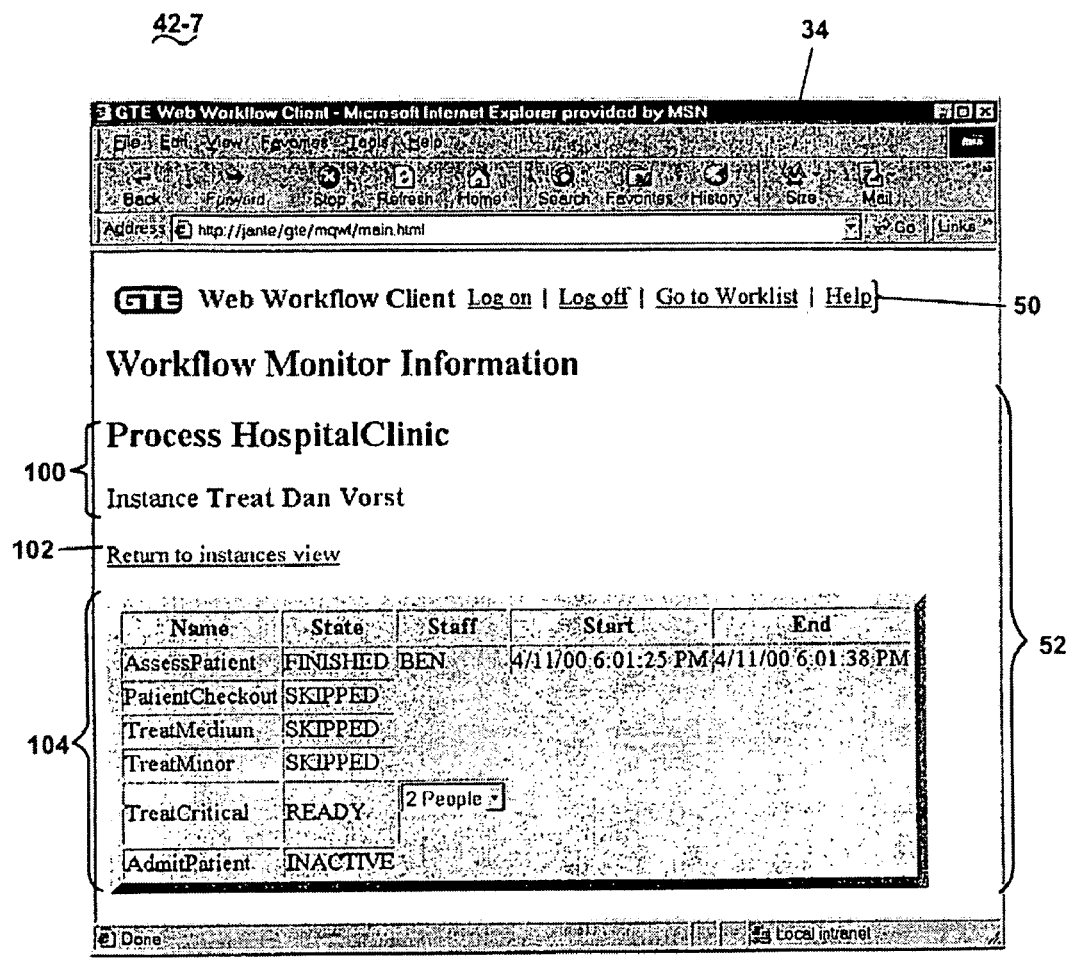
FIG. 7 is a control page as shown in FIG. 3 for displaying the status of particular tasks of a particular selected process instance as defined by a process template of the workflow management system.

Turning to FIG. 7, the workflow monitor control page 42-7 is shown displaying the status of all work activities in a process instance. A title area 100 identifies the particular process template forming the process as well as the name of the particular process instance. A hyperlink area 102 can be provided therebeneath for providing an efficient one-click return to the Instances control page 42-6. Of course, the hyperlink area 102 is context-specific, i.e., if the user has navigated to the control page 42-7 from the worklist page 42-5 the user is returned thereto by clicking on the link 102. However, if the user has navigated to the control page 42-7 from the Instances control page 42-6, then the link area 102 returns the user thereto as described. Of course, similar navigation occurs if the user navigates to this page from other pages as well, such as the Notifications control page as well.

A table 104 is provided which has several columns identifying the particular work items (as rows in the table 104) for that particular process instance of the identified process template. Preferably, the row item activities are listed in the order that work on them is/was performed.

Figure 8:
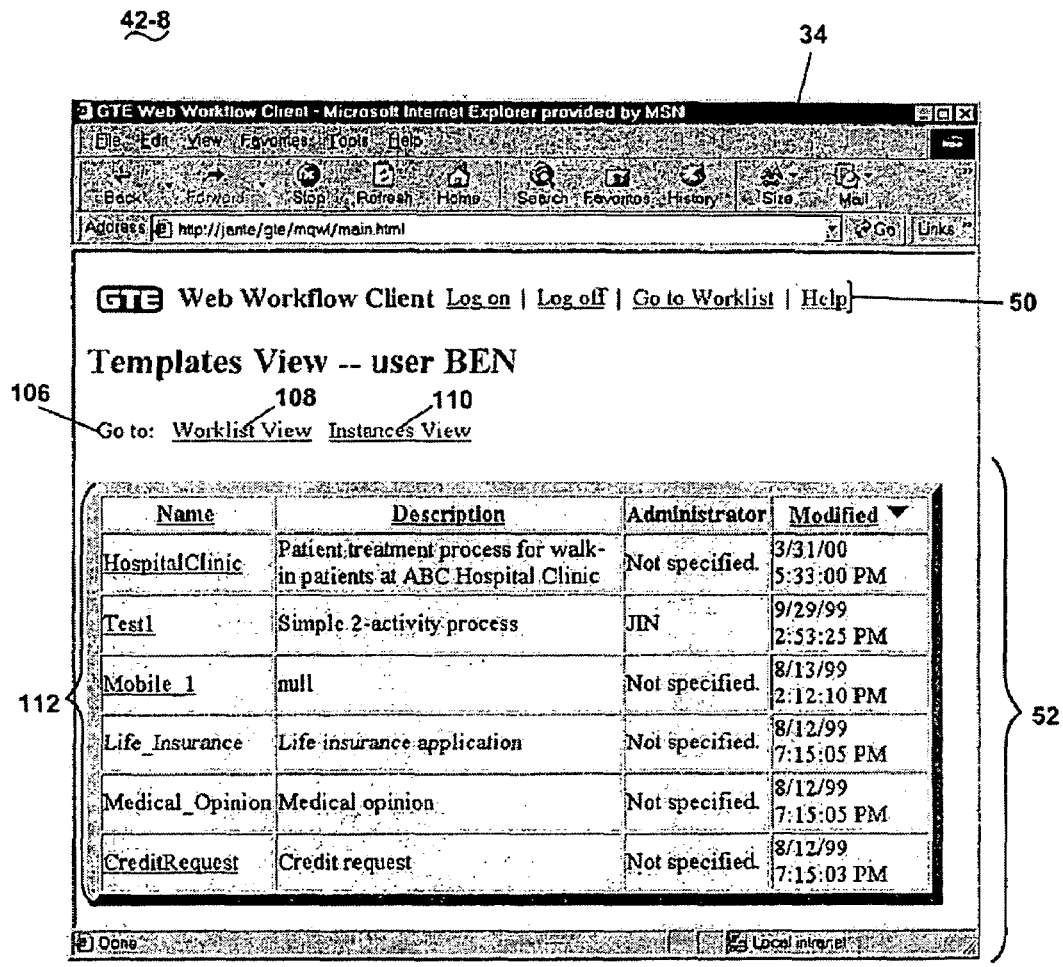
FIG. 8 is a control page as shown in FIG. 3 for displaying all processes accessible by a particular user, wherein selected process templates are shown as clickable hypertext links which can be instantiated merely by clicking thereon.

Turning to FIG. 8, the templates view control page 42-8 shows the process templates from which a user is authorized to create instances thereof. A navigation bar 106 is provided which includes a Worklist View link 108 and an Instances View link 110. The Worklist View link 108, when clicked, jumps a user to the worklist view control page 42-5. The Instances View link 110, when clicked, jumps a user to the process instances view control page 42-6. A table 112 is provided therebeneath, which includes, as its row data items, all process templates available for viewing by the user.

If a user is authorized to initiate an instance of any of the process templates, the interface 40 converts these data items (such as by converting the name of the process templates to links in the "Name" column) to hypertext links. When a user clicks on the link in the "Name" column, a new process instance of the clicked-upon process template is created by calling a New Instance servlet 46-20 described below with respect to FIG. 20.

Typically, the interface 40, upon a single-click initiation of a new process instance, jumps the user to an activity user interface page 44 to gather required information for the new process instance (see the activity user interface page 44 described below with respect to FIG. 15). For process instances, which do not require user-entered information via an activity user interface page 44, simply clicking the hypertext link in the "Name" initiates a new process instance of that process template.

Turning to FIGS. 9–13, another important inventive feature of the interface 40 will be described, namely, the ability to selectively sub-query or "filter" a user's worklist and work items assigned to other users (as long as the user has clearance in the WFMS 10 to view other user's worklist information) using an intuitive and easily customizable filter builder 120. It will be noted that, with respect to FIGS. 9–13, the filter builder 120 often employs both first and second frames 52 and 54 and these pages will be described with respect to the content of each of the frames 52, 54. Of course, this invention also contemplates making a portion of the filter invisible or unalterable by a user, i.e., the portion of the filter expression that limits the users worklist to items where that user is the owner (such as the "OWNER=BEN" expression in FIGS. 9–13).

When there are many work items on a user's worklist, it can look cluttered and confusing. One way to restrict the worklist size, as described above, is to place a limit on the number of items (i.e., num items) of the worklist by using the text box 78 in the worklist view control page 42-5. Another way is provided in the inventive interface 40 described herein is by employing the filter builder 120. Filtering is generally the process of selecting a sub-recordset of records from the worklist that match certain criteria.

A filter is a set of conditions on a work item. If the conditions are not true, then a particular work item is filtered out and not shown in the worklist. A filter expression is a formal statement of a filter and is referred to herein by reference numeral 122. The filter builder 120 is employed to easily and intuitively build even complicated filter expressions 122. One example of a filter expression 122 is OWNER=BEN AND (STATE=READY). Any worklist items not having their OWNER equal to the user identifier BEN and their STATE parameter equal to READY will be restricted from the results of the filter builder 120.

Figure 9:
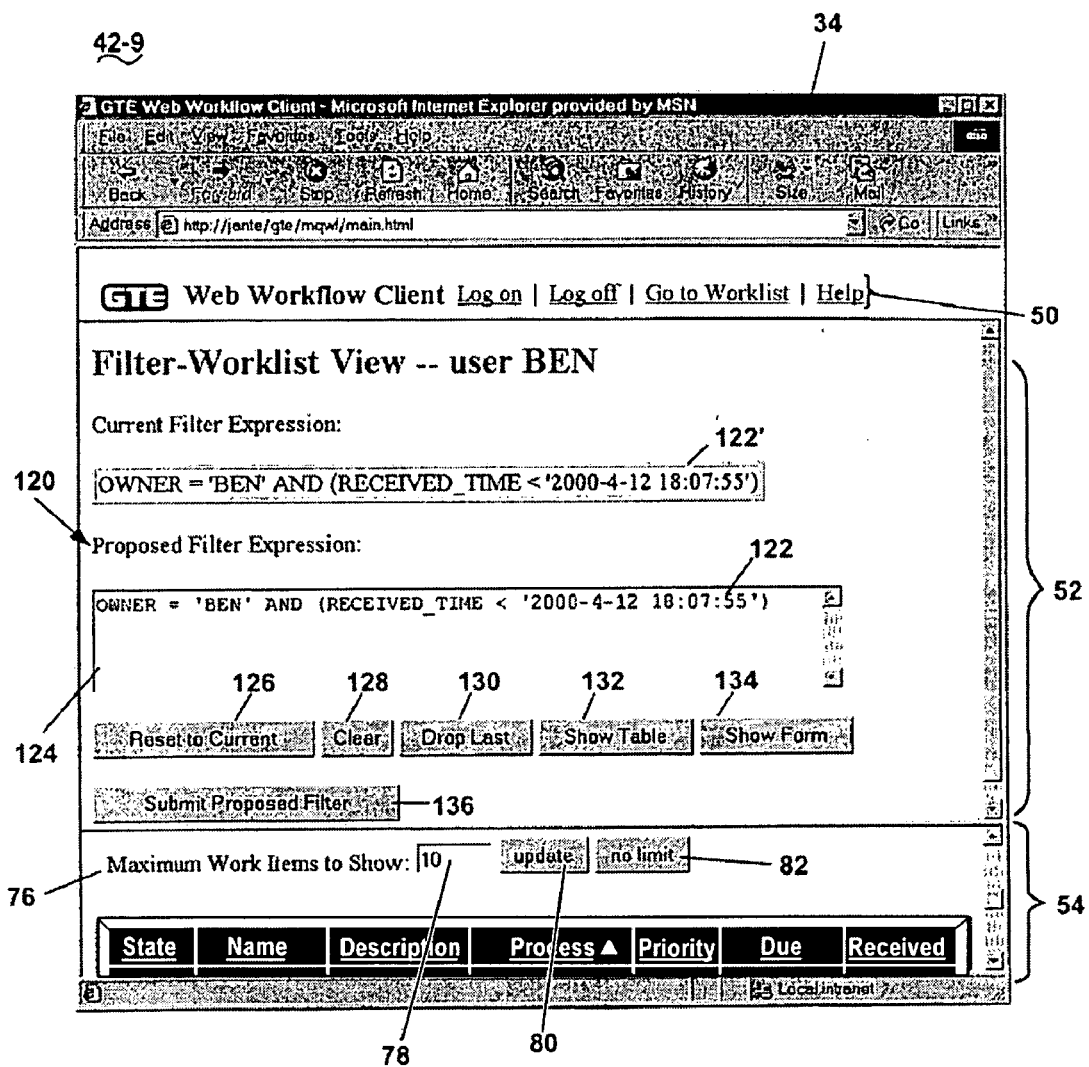
FIG. 9 is a control page as shown in FIG. 3 for interactively selecting recordsets from the active processes and process tasks by defining a filter criteria expression.

FIG. 9 shows a filter-worklist control page 42-9 for interactively selecting recordsets from the active processes and work items by defining the filter expression 122. The filter-worklist control page 42-9 permits a user to update a filter expression 122 that can be applied to a user's worklist simply by intuitively clicking on hyperlinks and buttons provided on the filter-worklist control page 42-9.

A view of a current filter expression 122' is displayed in the first frame 52 of the filter-worklist control page 42-9. The current filter expression 122' is also defaulted into the proposed filter expression 122 located in a text box 124 therebeneath. The second frame 54 of the filter-worklist control page 42-9 provides interfaces that permit a user to modify the proposed filter expression 122 in the text box 124 without requiring that the user know the syntax of the filter expression 122 in the text box 124.

The current filter expression 122' is the current filter applied to a user's worklist. If the user has not set a filter, the current filter expression preferably defaults to OWNER equals the user identification code of the user to specify the owner of the work items in the user's worklist. The proposed filter expression 122 is shown in the text box 124 therebeneath. The proposed filter expression 122 is the filter expression that the user will manipulate through its use of the filter-worklist control page 42-9. The user adds criteria by using the second frame 54 of the filter-worklist control page 42-9. In the first frame 52 of the filter-worklist control page 42-9 are a plurality of buttons that can affect the proposed and current filter criteria 122 and 122', respectively.

A "Reset to Current" button 126, when pressed, resets any modifications made to the current filter expression 122', changes the proposed filter expression 122 in the text area box 124 to be the same as the current filter expression 122'. A "Clear" button 128, when pressed, clears the proposed filter expression 122 from the text box 124 and changes it to the default filter expression of OWNER=the user's log on identification code. A "Drop Last" button 130, when pressed, removes the last entry in the list of criteria in the proposed filter expression 122 displayed in the text box 124. A "Show Table" button 132, when pressed, queries the WFMS 10 and displays a result recordset in a table in the second frame 54. A "Show Form" button 134, when pressed, sets the second frame 54 of the filter-worklist control page 42-9 to a form view of filterable criteria that can be added to the proposed filter expression. A "Submit Proposed Filter" button 136, when pressed, transforms the proposed filter expression 122 created by the user into the current filter expression 122' updating the current list of work items displayed.

When the Show Table button 132 is clicked the filter-worklist control page 42-10 is shown. The user can thereby add criteria to the proposed filter expression 122 in the text box 124 merely by clicking on links displayed in a worklist table 138 displayed in the second frame 54. The table 138 resembles the worklist table 74 previously described with respect to the worklist control page 42-5 and is therefore familiar to the user. Every row in the table 138 represents a work item in the user's worklist.

Unlike the worklist view control page 42-5, however, the entries in the table 138 in the second frame 54 are used to add criteria to the proposed filter expression 122. Each time the user clicks on a link in the table 138, the proposed filter expression 122 is appended with a criterion matching the clicked-upondata. For example, if the user clicks on a row data entry 141 in the "Name" column, the filter expression 122 will be appended with NAME=data, where data equals the hypertext link on which the user clicked. The change is reflected immediately in the proposed filter expression 122, although the user must click on the "Submit Proposed Filter" button 136 in the top frame 52 to see the update to the user's worklist.

For each click on a link in the table 138, i.e., each addition to the proposed filter expression 122, the user can control how the clicked-upon criterion is added to the proposed filter expression. First, the user controls the comparison operator 140 added between the new criterion 141 clicked-upon in the table 138 and any previous text defined in the proposed filter expression 122.

The comparison operator 140 is selected by the user from a drop down list 142 above the table 138 of work items. The choices in the list 142 for the comparison operator 140 can be selected from a group consisting of: EQUALS, NOT EQUALS, GREATER THAN, and LESS THAN.

Thus, in the example of clicking on a row data item in the "Name" column, a user might click on the hypertext link "Activity1". Then, if the comparison operator 140 selected from the list 142 is the EQUALS operator, the text "NAME='Activity1'" (or any other appropriate syntax as required by a particular WFMS 10) will be added to the proposed filter expression 122. This means that, if the name of the activity is equal to "Activity1", this work item will be displayed on the user's worklist.

Preferably, the operators EQUALS and NOT EQUALS match exact states, character strings, or dates (including seconds). The operators LESS THAN and GREATER THAN preferably match character strings according to lexicographic ordering and match dates chronologically.

Another way the user can control how an addition is made to the proposed filter expression 122 is with a filter connector 144.

Figure 10:
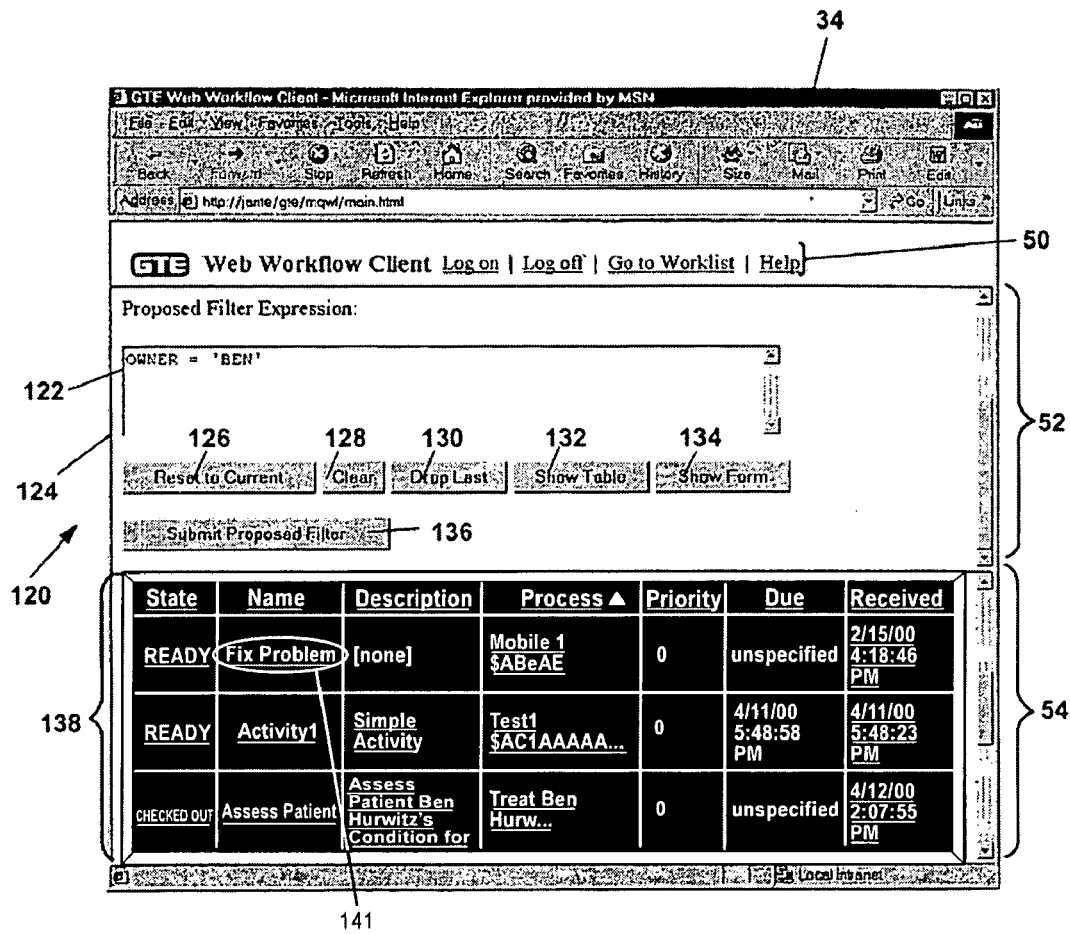
FIG. 10 is the filter control page as shown in FIG. 9 displaying a table filter builder wherein the filter criteria expression can be created by a single click on a link in a table therein.
Figure 10A:
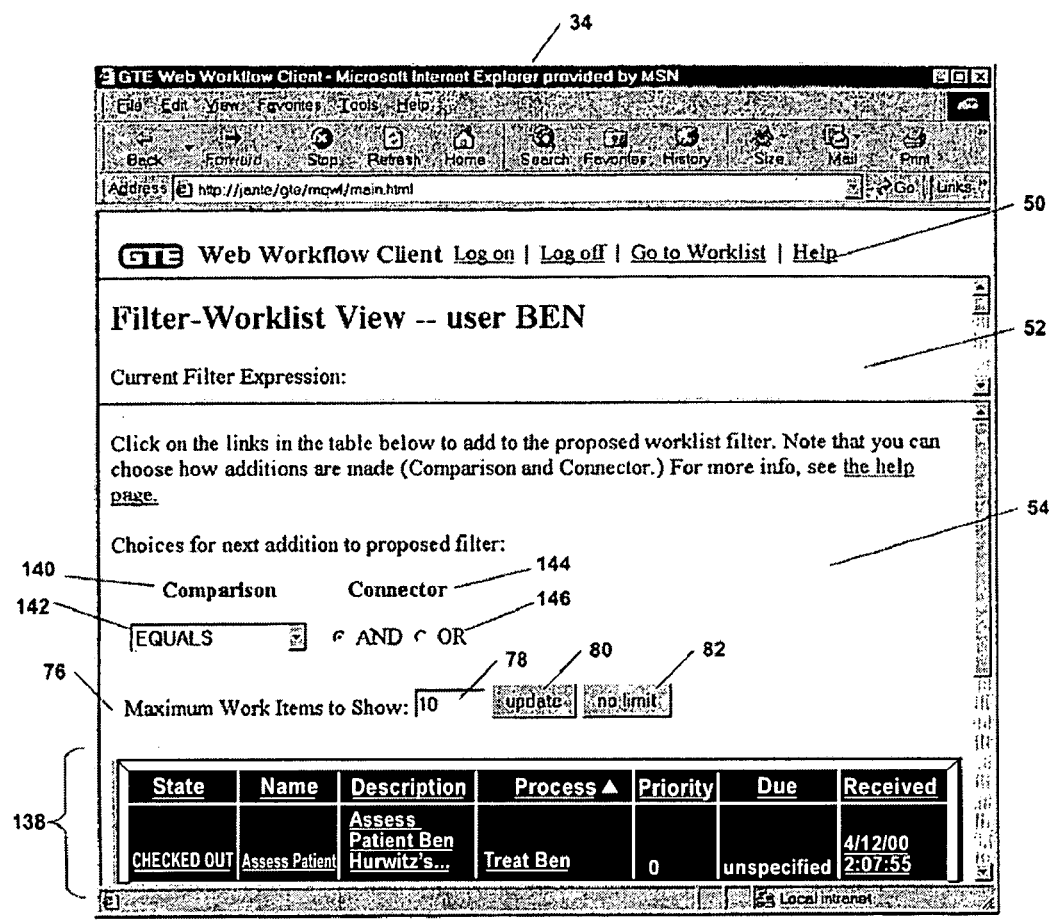
FIG. 10A is the filter control page as shown in FIG. 10 displaying a table filter builder wherein the filter criteria expression can be created by a single click on a link in a table therein with specific reference to a filter control and criteria controls provided on the filter control page.

A user preferably selects the connector 144 with a control 146, such as the radio buttons shown in FIG. 10A. The user can select AND or OR as a filter connector from a pair of radio buttons. The control 146 dictates the logic applied to the proposed filter expression 122 as compares to previous criteria pre-existing therein. When the user adds a new criterion for filtering, the control 146 determines whether the selected criterion is appended to the proposed filter expression 122 preceded by the word "AND" or "OR".

The meaning of these words in this context is that, for a pair of expressions separated by "AND", both must be true for a work item not to be filtered out of the user's worklist. For a pair of expressions separated by "OR", if neither of the expressions is true for a work item, then the work item is filtered out of the user's worklist. A user can change the filter connector between additions to the proposed filter, but that it resets to its default value (AND) when the filter-worklist control pages 42-10 or 42-10A are reloaded.

The logic connectors 144 preferably follow a precedence rule such as, when filtering, the WFMS 10 evaluates AND before OR. This means that an expression such as NAME='Activity1' OR PRIORITY=2 AND PROCESS_NAME='Process3' will filter out any work item whose name is not "Activity1" unless the work item both has a priority of 2 and is part of the process instance whose name is "Process3".

Note that when the selected filter connector is "AND", any criteria added by a user further restricts the user's worklist, making it no larger than before the user added the criterion, and perhaps smaller. When a user's filter connector 144 is set to "OR", the user increases or does not affect the size of the user's filtered worklist.

Figure 11:
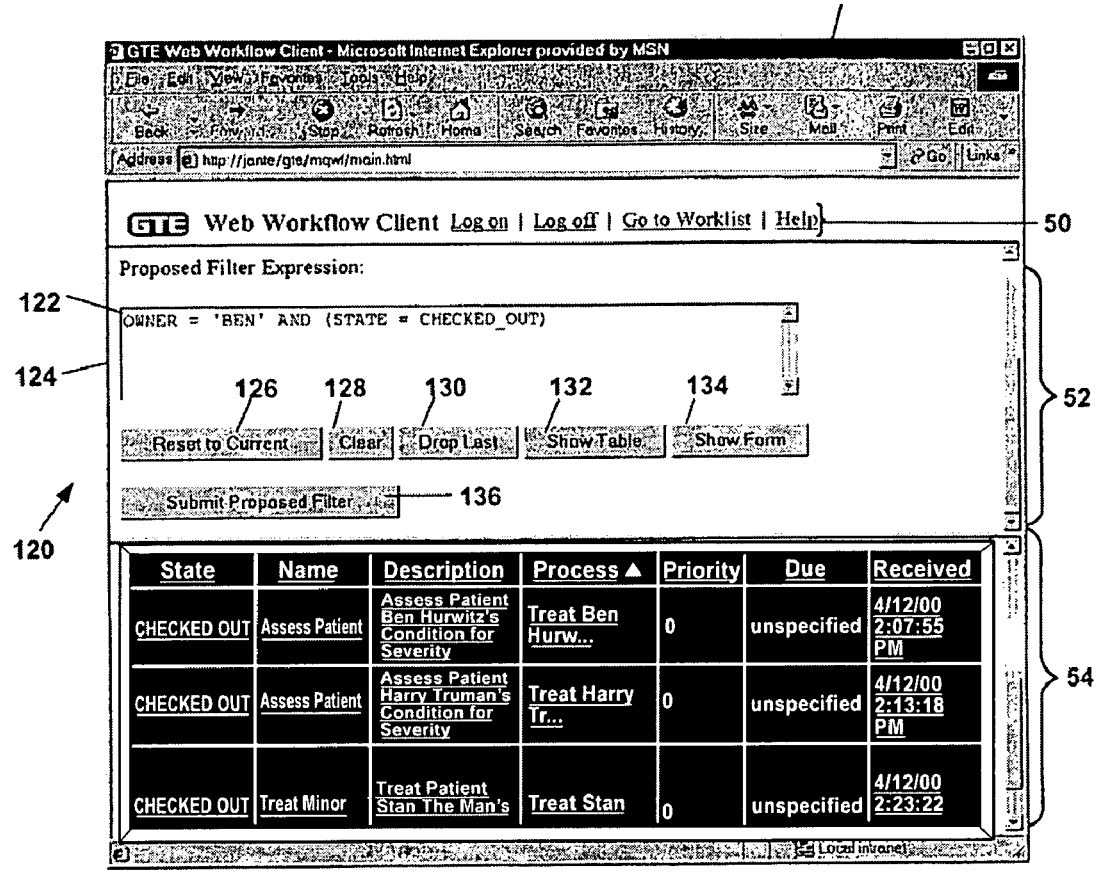
FIG. 11 is the filter control page as shown in FIGS. 9–10 displaying the criteria added to the filter criteria expression from clicking a link in the table.

FIG. 11 shows the filter-worklist control page 42-11 after a new criterion has been added to the proposed filter of FIG. 10 according to the table clicking method described above.

Figure 12:
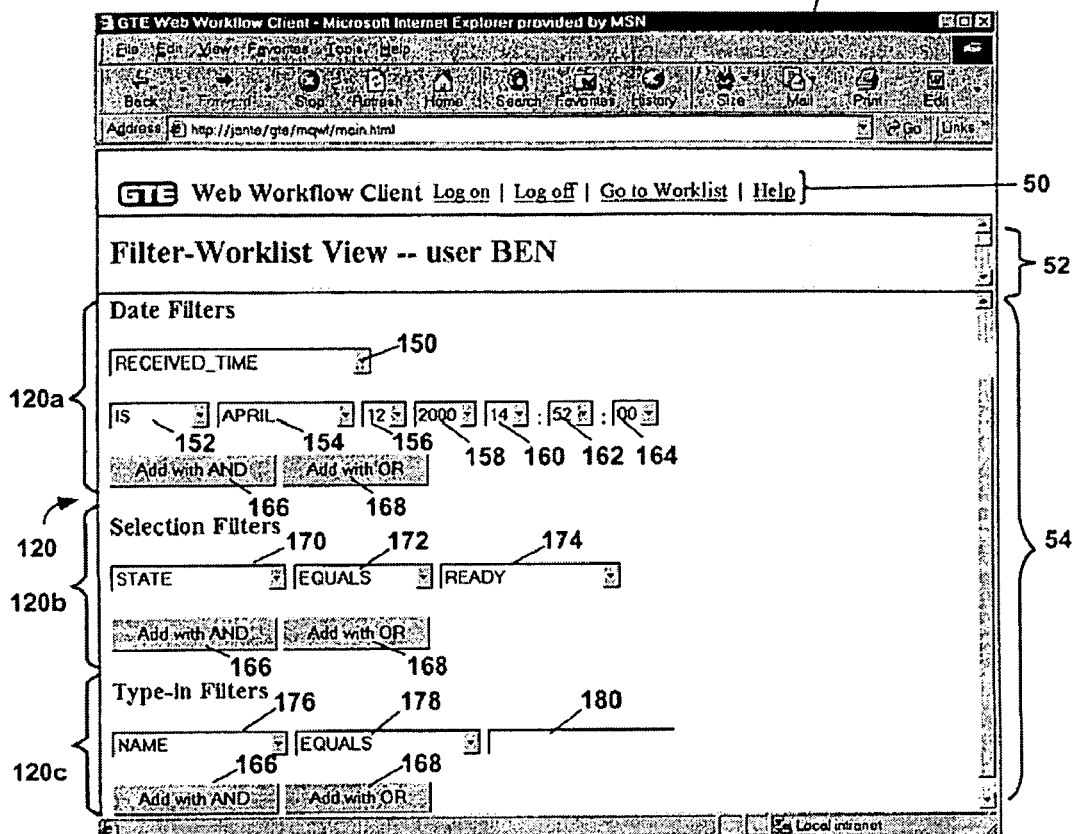
FIG. 12 is a control page as shown in FIGS. 9–11 displaying a second criteria builder, wherein several interactive criteria builders are shown including a date filter builder, a selection filter builder and a type-in filter builder.

Turning to FIG. 12, a filter-worklist control page 42-12 is shown wherein several interactive filter builders 120 are shown including a date filter builder 120a, a selection filter builder 120b and a type-in filter builder 120c in the second frame 54 of the filter-worklist control page 42-12. These filter builders 120a–120c are shown when the "Show Form" button 134 is pressed from the first frame 52 of the filter-worklist control page 42-9. The second frame 54 thereby displays the various filter builders 120a, 120b and 120c that a user can use to add specific filters on work item properties to the proposed filter expression 122.

The date filter builder 120a comprises a field name drop down menu 150 and an operator drop down menu 152 wherein a user can select the particular date field, such as DEADLINE, in the menu 150 as well as the operator in the operator drop down menu 152. The date filter builder 120a further comprises several additional controls 154, 156, 158, 160, 162 and 164 for setting optional criteria such as the desired month, day, year, hour, minute and second, respectively, for appending to the proposed filter expression 122. The operator menu 152 can include such terms as "IS", "IS NOT", "BEFORE", and "AFTER", for example. An "Add with AND" button 166 and an "Add with OR" button 168 are provided to allow the user to add a logical operator to the proposed filter expression 122 as well.

The selection filter builder 120b comprises a field name drop down menu 170 containing a list of available field names for selection. The user can thereby filter on the field names in the control 170 by selecting the value the user desires to match from a list. The selection filter 120b further comprises an operator drop down menu 172, which contains various operators such as "EQUALS" or "NOT EQUALS". The selection filter builder 120 also has a third process state menu 174 which lists available values corresponding to the field names contained in the first menu 170. The values in the drop down menu 174 can be tied to the value selected in the field name drop down menu 170. The selection filter builder also has the logic buttons "Add with AND" and "Add with OR" 166 and 168, respectively, as previously described.

The type-in filter builder 120c allows a user to type in a specific value to filter on. The type-in filter builder 120c includes a first field name control 176, which includes various field names defined in the WFMS 10. An operator control 178 is also provided which contains selection items such as "EQUALS", "NOT EQUALS", "GREATER THAN", "LESS THAN", or "MATCHES". In the type-in filter builder 120c, a text box 180 is provided for typing a criterion therein. The last operator mentioned, "MATCHES", works along with the special characters "*" and "?" as well-known wildcard characters to represent an alphanumeric string of characters or a single alphanumeric character, respectively, to filter out items based on patterns. The type-in filter builder 120c includes the "Add with AND" and "Add with OR" buttons 166 and 168 as previously described.

Figure 13:
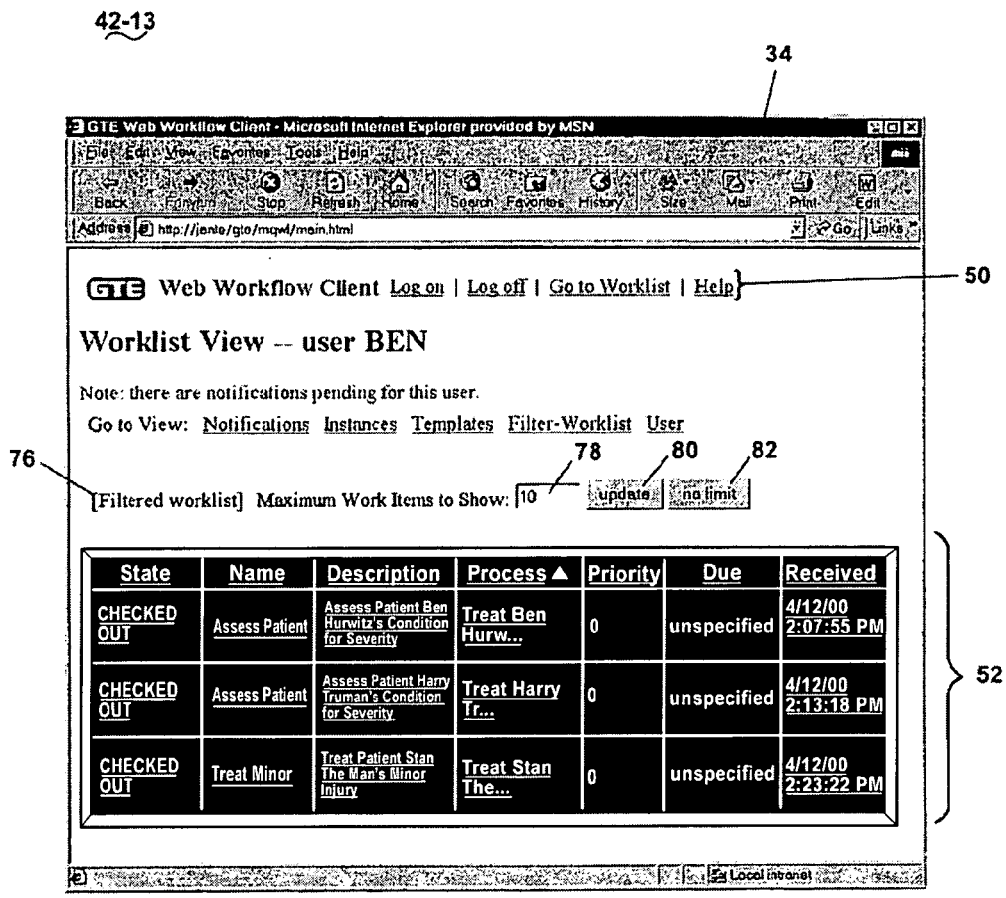
FIG. 13 is a control page as shown in FIG. 3 showing the results of the execution of a built filter criteria expression as defined in the control pages of FIGS. 9–12.

For each of the above types of filter builders 120a–120c, pressing the "Add with AND" or "Add with OR" button 166 and 168 adds the defined filter appendage to the proposed filter expression 122. The, the "Submit Proposed Filter" button 136 can be pressed to apply the proposed filter expression to the user's worklist and show the new worklist view. FIG. 13 is another view of the worklist control page 42-5 of FIG. 5, also referred to as a results control page 42-13, showing the results of the execution of a built filter criteria expression 122 as defined in the filter builders 120a–120c of FIGS. 9–12.

Figure 14:
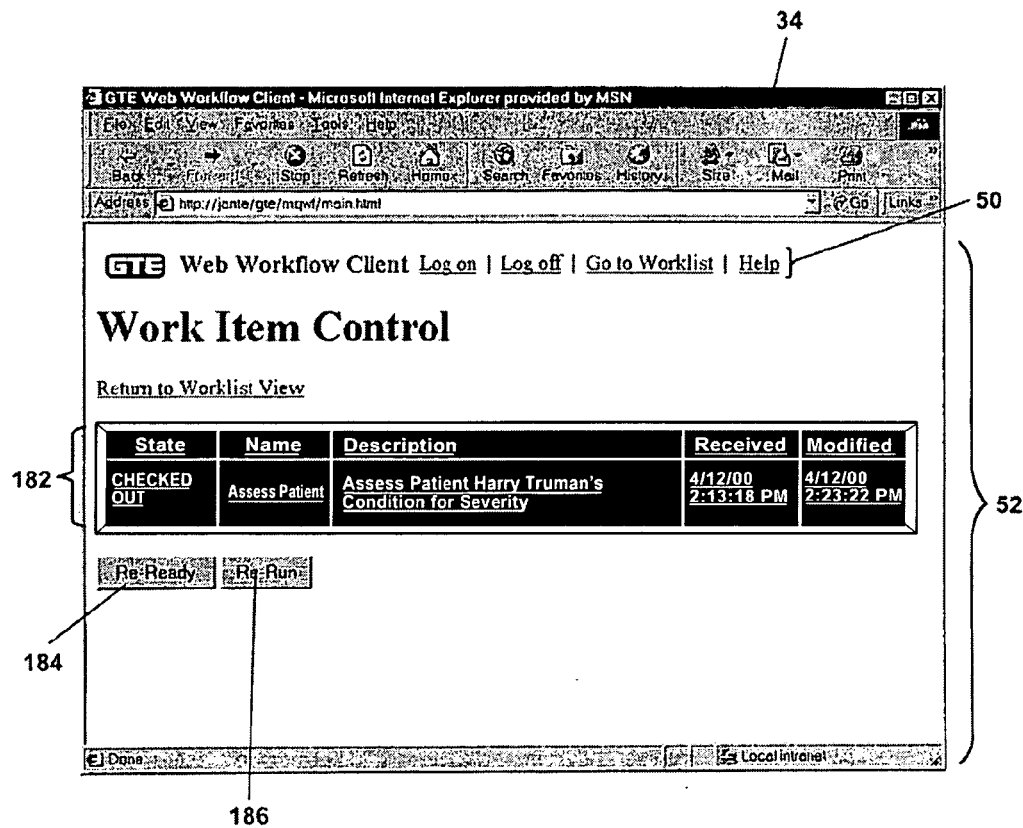
FIG. 14 is a control page as shown in FIG. 3 for updating a particular task item in a worklist or re-executing the work item to update information contained therein.

Turning to FIG. 14 is a control page as shown in FIG. 3 for updating a particular task item in a worklist or re-executing the work item to update information contained therein; and FIG. 14 is a work item control page 42-14 as shown in FIG. 3 for updating a particular task item in a worklist or re-executing the work item to update information contained therein. Control page 42-14 is relatively simple in its appearance with a table 182 showing the contents of the particular work item typically selected from the worklist control page 42-5 or from a process instance control page 42-6. Form buttons titled "Re-Ready"<184> and "Re-Run"<186> are provided for performing the particular work item indicated in the table 182. This control page 42-14 then invokes the Activity servlet 46-18 described below (see FIG. 18) to indicate to the WFMS 10 that the work item has been performed. This function is also performed if the user cancels the work item processing as well.

Figure 15:
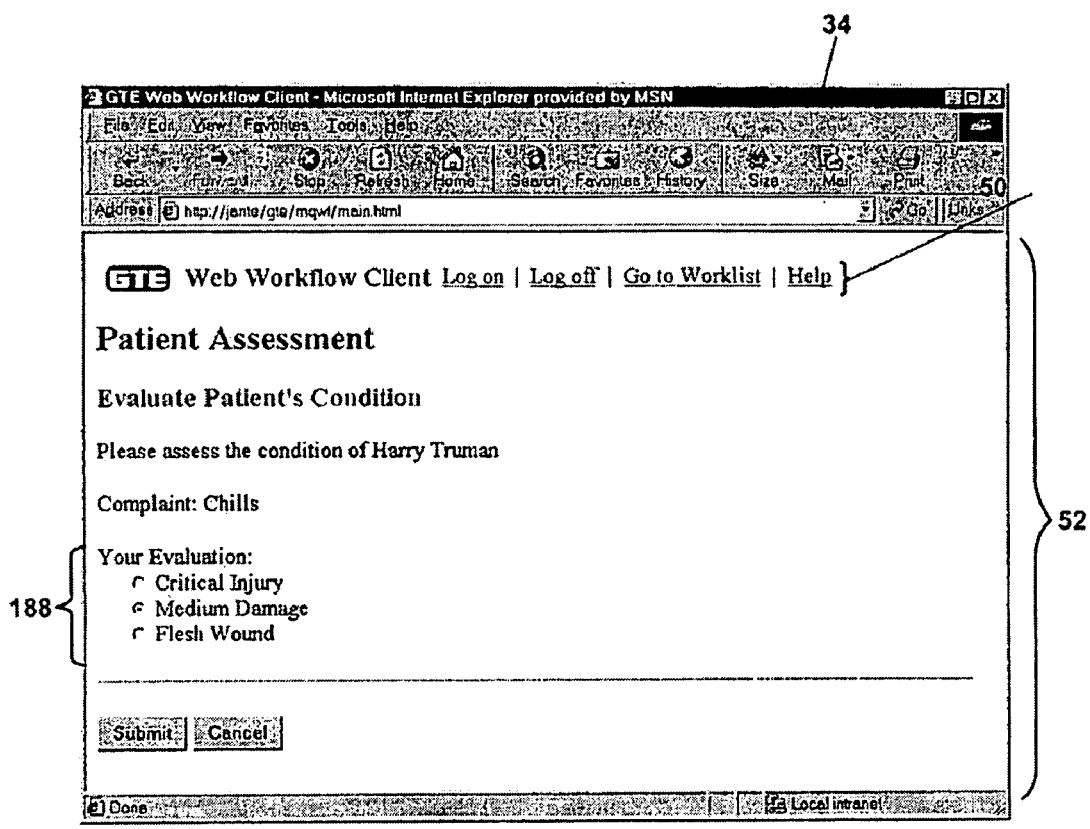
FIG. 15 is an example of an activity user interface page as shown in FIG. 3 for providing an input to a particular work item task such as that invoked by the work item update page of FIG. 14.

FIG. 15 is an example of an activity user interface page 44 wherein a user enters data via the user interface page 44 for process templates or work items which require user-entered data to instantiate a process or to complete a work item. As can be seen by the example of FIG. 15, various HTML <FORM> controls 188 can be added to the page (typically by the client's network administrator designing the user interface pages 44 to collect the appropriate data from the users). These <FORM> tags can include all allowable HTML user interface tags. For example: <TEXT>, <INPUT>, <TEXTAREA>, <CHECKBOX>, <BUTTON>, etc. Since these user interface pages 44 will take any form depending upon the network administrator's preferences and the requirements of the particular WFMS 10, they are not discussed in detail here. Particular attention can be paid to the guidelines set forth at the end of this description of how to embed HTML and scripting commands to call the desired servlets 46 to access the functionality of the WFMS 10 and provide the user-entered data in the user interface pages 44 thereto.

Figure 16:
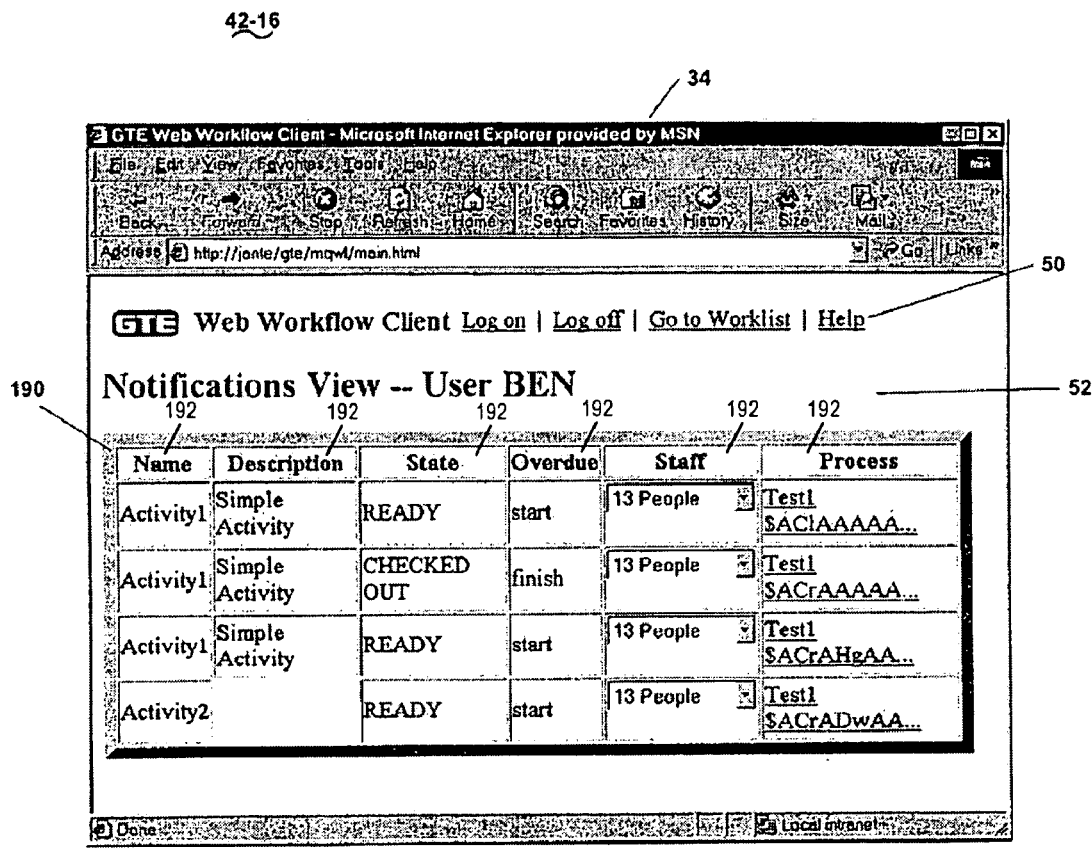
FIG. 16 is a control page as shown in FIG. 3 for providing on-line notifications to a user.

Turning to FIG. 16, the Notifications view control page 42-16 shows informational messages for the user, typically issued by the WFMS 10 because the user did not complete a particular work item by a designated deadline. The Notifications control page 42-16 is accessible through the worklist control page 42-5 such as by clicking on the Notifications link 64 (if activated).

The notifications control page 42-16 includes a table 190 having several columns 192 with column headings that display predetermined information available from the WFMS 10 about overdue activities, with one row of the table provided for each notification instance. The columns 192 provided in the table 190 can include "Name", "Description", "State", "Overdue", "Staff", "Process", etc. The data in the "Process" column can be converted to a hypertext link by the interface 40 which, when clicked, jumps the user to the workflow monitor information control page 42-7 that shows information about the specific process instance which may have contained a notice such as an overdue notice in the Notifications table 190.

The servlets 46 will now be described with reference to FIGS. 17–20. The servlets 46 employ several classes designed in accordance with this invention for acting as the bridge 48 between the WFMS 10 and the web server 32 and the client browser 34.

These custom classes making up the bridge 48 fall into two categories for this invention. The first category is the WFMS platform-specific classes that access the functionality and basic database structure and contents of the WFMS 10. These custom classes need to be customized for each type of WFMS 10 platform or to detect a type of registered WFMS 10 platforms such as those identified in the background section of this application. The second category is the interface classes that access the first category of classes to provide results to the user of the interface 40. In this way, the first and second categories of custom classes are able to take and send requests from a platform-independent interface (like the browser 34) and interact with an application-specific WFMS 10. In other words, the second category of classes take and receive the user's requests and output and funnel them to and from the WFMS 10 through the first category of custom classes.

It will be understood that, although Java-like terminology including methods, constructors, etc., is used to describe the structure, functionality and operation of the servlets 46, other programming implementations can be employed without departing from the scope of this invention.

One important first category custom class pursuant to this invention is the ListData class that encapsulates workflow state information of the WFMS 10 in list form. Although quite complex, it will be illustrated below that the basic data stored in the WFMS 10 is returned by the ListData class including: worklists (see control page 42-5), process instance lists (see control page 42-6), process template lists (see control page 42-8), process instance monitoring lists (see control page 42-7), work item state lists (see control page 35 42-14), notification lists (see control page 42-16) and filter tables (see control pages 42-9, -10, -10A, -11, -12, -13), i.e., worklist data but formatted for filtering instead of worklist behavior.

Worklists, process instance lists, process template lists, and notification lists can all be derived from a workflow user login per the Log On servlet 46-17 discussed below. Process instance monitoring lists and work item state lists provide data for a particular process instance or work item, and thus use a separate constructor with an additional parameter to identify their object.

In addition to specifying which type of list to create, invokers of the constructor methods provide a format for the list data such as like headings of columns in a table. Each type of list can accept its own format elements; invoking procedures choose which ones to include. Data will be returned for display in the order specified in a parameter such as ascending order or descending order. Examples of allowed format column headings for a particular WFMS 10 are shown by example in the following:

For worklists, including worklist filter tables:
STATE, NAME, DESCRIPTION, DUE, PRIORITY, RECEIVED_TIME For process instance lists:
STATE, NAME, DESCRIPTION, START_TIME For process template lists:
NAME, DESCRIPTION, ADMINISTRATOR, MODIFIED_TIME For process instance monitor lists:
NAME, STATE, STAFF, START_TIME, END_TIME For work item state lists:
STATE, NAME, DESCRIPTION, RECEIVED_TIME, MODIFIED_TIME For activity notification lists:
NAME, DESCRIPTION, STATE, OVERDUE, STAFF, PROCESS Some lists returned by the ListData class are sortable by columns. The constructors for worklists, process instance lists, and process template lists all take an additional parameter for sort criteria, which can also be passed as a null value.

It should be noted that the ListData class implements java.util.Enumeration, so users may iterate through results using Enumeration methods such as nextElement( ). The results are set up in terms of rows: each element in the ListData enumeration is an instance of java.util.Vector, with one element of the Vector for each column in the format supplied to the ListData constructor.

The following table lists the variables defined in the ListData class for accessing the functionality of a WFMS 10:
ACTION, ADMINISTRATOR, DESCRIPTION, DUE, END_TIME, MODIFIED_TIME, NAME, OVERDUE, PRIORITY, PROCESS, REASON, RECEIVED_TIME, STAFF, START_TIME, STATE, STATE_CHANGE, and TYPE are all examples of format parameters that can be passed to the ListData constructor. These variables are typically embedded into a string to make a query request to the WFMS 10 as will be described below with respect to the constructors for ListData.

ACTIVITY_NOTIFICATIONS_TYPE, INSTANCES_TYPE, MONITOR_TYPE, PROCESS_NOTIFICATIONS_TYPE, TEMPLATES_TYPE, WORKITEM_TYPE, WORKLIST_FILTER_TYPE, and WORKLIST_TYPE are all examples of values usable as type parameters when passed to a ListData constructor.

The definition of the ListData class also includes several methods/functions therewith. Several examples of these methods and the functions they perform are listed below (methods which are merely implemented methods of java.util.Enumeration are not listed below but are incorporated herein by reference):

columnString(int): Maps public column name constants to string representations for display.

getError( ): For debugging, produces an error message when a __ is not valid.

getSortName(int): Maps a WFMS 10 column to a string acceptable as a sort criterion.

isSortable(int): Reports whether the column identified by int is sortable for this instance of list data.

isvalid( ): Checks if a newly created ListData object can be used.

length( ): Returns the total length of rows in the ListData object.

linkColumn(int, String): Returns a common link for a sortable column name (int) and a URL path (String) to link to.

linkColumnString(int, String): Returns an HTML link code (int) for a sortable column name and a URL path to link to.

For example, one way by which the ListData class can be called with the INSTANCES_TYPE, TEMPLATES_TYPE, and ACTIVITY_NOTIFICATIONS_TYPE types is (where Session is a variable defined by the LogIn servlet 46-17 to identify a particular user's session identifier):

ListData (Session session,
  int type,
  int format[ ],
  String sortCriterion)

This constructor is used with list types INSTANCES_TYPE, TEMPLATES_TYPE, and ACTIVITY_NOTIFICATIONS_TYPE and returns a ListData instance which implements java.util.Enumeration. Elements of this enumeration will be instances of java.util.Vector, representing one row of data, with an element of the row for each element of the format. Parameter sortCriterion can be passed as a null value but, if supplied, it controls the ordering of the ListData as returned by the Java Enumeration method nextElement( ).

Another example of a constructor to use with list/table types WORKLIST_TYPE and WORKLIST_FILTER_TYPE is:

ListData (Session session,
  int type,
  int format[ ],
  String sortCriterion,
  String filter)

The filter parameter can be passed as a null value. If provided, it should be a valid filter expression for a worklist as specified in the WFMS-specific application program interface. It should be noted that the filter worklist control pages 42-9 through 42-13 supply such a worklist filter expression, which is provided to the WFMS 10.

FIG. 17 is a flowchart detailing the structure, function and operation of the Log On servlet 46-17 typically invoked by the log on control page 42-4 described with respect to FIG. 4. The Log On servlet 46-17 takes input parameters 202 for User ID and Password <200> passed by the log on control page 42-4. Then the servlet 42-17 determines whether the user is authenticated, i.e., has entered a correct password <204>. If not, the servlet ends, preferably by returning the user to the log on control page 42-4.

If the user has properly authenticated himself, the servlet creates a new object from a first category custom class called WFSessionType <206>.

The WFSessionType class encapsulates much of the workflow interaction that the control pages 42 have with a particular WFMS 10. The interface or class implementing it is used ubiquitously throughout the web client implementation.

The main variables contained in the WFSessionType class are: LOGOFF_FAILED and LOGON_OK (return codes from a disconnect( ) and connect( ) methods discussed below), MAX LIMIT (the maximum number of items that can be returned from a query), and UNKNOWN_LIMIT (the number of items to return from a query when a particular limit is not known).

The WFSessionType class has several methods configured to link to the WFMS 10 to return important information about the user who has successfully authenticated with the WFMS 10, sets many user-configurable preferences and settings, and maintains connection status information throughout the user's session with the WFMS 10.

getperson( ) method returns a user information class object for the logged-in user. setSort (String criterion) puts info about a sorting criterion into the session. setWorklistLimit(Integer limitI) sets the limit of how many items to show in the user's worklist as input in setting bar 76-82 in worklist view control page 42-5. getSortField( ) returns the stored sort criterion. isSortAscending( ) returns a Boolean value to indicate if the user's desired sort order is ascending (i.e., as shown by indicator arrow 86 in control page 42-5).

getWorklistLimit( ) returns the limit on the number of work items entered in text box 78 on control page 42-5. getUserID( ) returns the user ID stored for the session. isConnected( ) sees if the connection in the session (still) exists. connect(String userid, String password) creates a log on connection to the WFMS 10 and returns LOGON_OK or LOGON_FAILED depending upon the result. disconnect( ) terminates the current session, logs the user off and returns result code LOGOFF_OK or LOGOFF_FAILED.

isNotified( ) returns true if there are notifications for this user and prompts control page 42-5 to display and enable the notifications bar 60 therein. getFilter(int type) returns the text of desired filter type of one of the parameters defined above in the ListData class.

The Log On servlet 46-17 invokes WFSessionType.connect(UserID, Password) to establish a session connection to the WFMS 10 <208>. The servlet then jumps the user's navigation to the Worklist control page 42-5 <210> and passes the WFSessionType object thereto <212>. The user can then view and manage their worklist 74 from the worklist control page 42-5.

Figure 18:
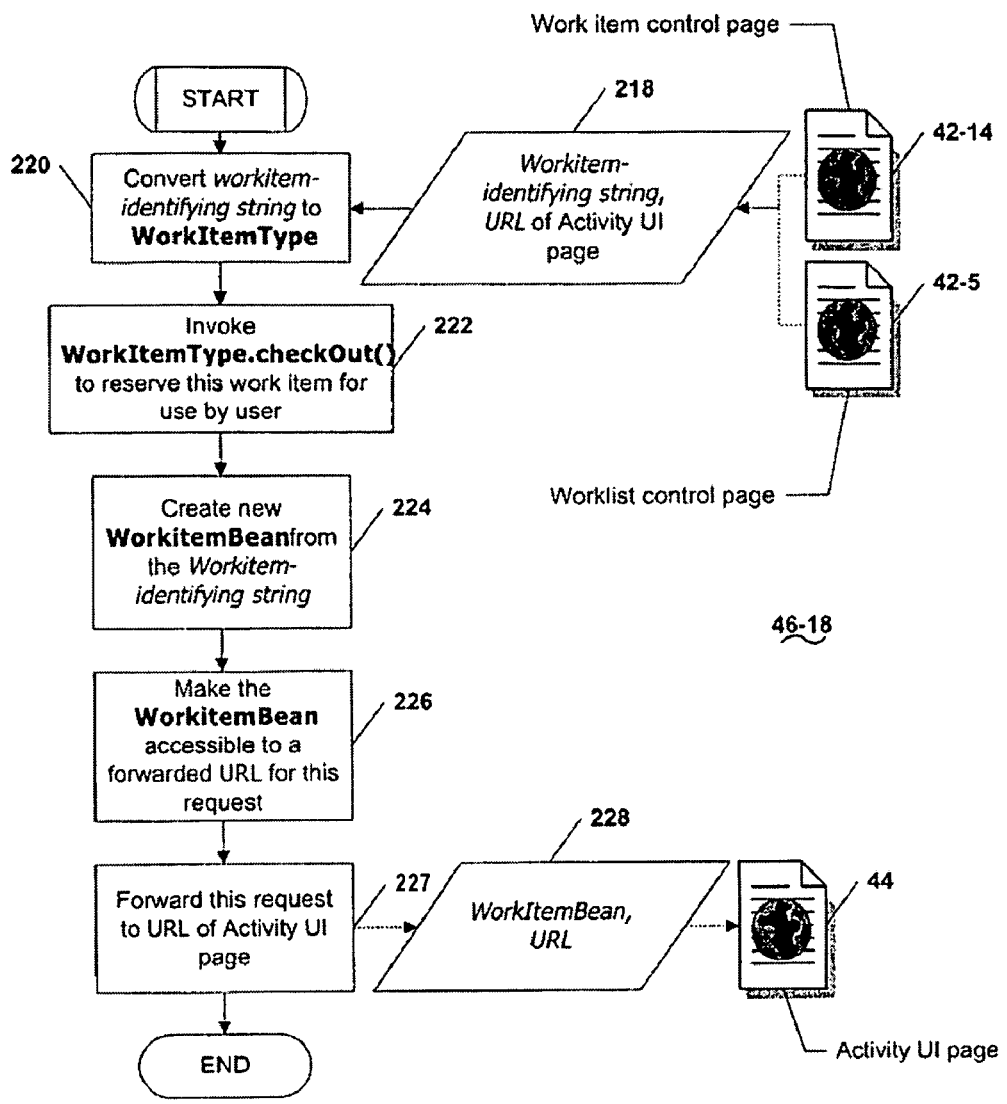
FIG. 18 is a flowchart detailing the structure, function and operation of an Activity servlet typically called by an activity user interface page described with respect to FIG. 5 or the work item control page described with respect to FIG. 14.

FIG. 18 is a flowchart detailing the structure, function and operation of an Activity servlet 46-18 called by a worklist control page 42-5 described with respect to FIG. 5 or the work item control page 42-14 described with respect to FIG. 14, and takes input parameters for a workitem-identifying string and a URL of a target activity user interface page 44 to get any required information from the activity user interface page 44 <218>.

First, the Activity servlet 46-18 converts the received parameter workitem-identifying string to a WorkItemType object <220>. The WorkItemType class acts as an interface that shows the public view of a Work Item (an object that appears on a user's work list, it represents work to perform, and is completed by the user when the user submits the form on the target activity user interface page 44). Without providing a great amount of detail on the WorkItemType class, the most important basic operations on a work item are "check out" and "check in". "Check out" (called by a checkOut( ) method of the WorkItemType class) reserves the work item for the user so that only he may work on it, and "check in" (called by a checkin( ) method of the WorkItemType class) is performed when the work is done to release the user's lock on the record(s). The way to access input data of a work item is through a WorkitemBean class described below.

Thus, the Activity servlet 46-18 invokes WorkItem-Type.checkOut( ) <222> to reserve the desired work item identified by the workitem-identifying string <218> for use by the user. The Activity servlet 46-18 then creates a new WorkitemBean <224> as identified by the Workitem-identifying string <218>.

The WorkItembean class is derived from an OidBean class. Generally, the OidBean class encapsulates an object with an "oid" attribute—an object identifier, represented with a string. This is a parent class to other classes that implement more than just an oid attribute. Methods invokable within the OidBean class include: setOid(String oidvalue) and getoid( ) for controlling the object identifier.

Now, turning to the WorkItemBean class, this class defines an object that represents a work item, for use within the page that comprises the activity user interface 44 for that work item, i.e., where the work item must get its data for the user to complete the work item. The main user interface to this class is the method getValue(name), for accessing an input data element as a String.

This object constructor is formed as WorkitemBean(Session, String) for use within the activity user interface pages 44. Various methods are invokable within the WorkitemBean class. activitypage( ) returns, as a String, the URL targeting the address for the activity user interface page 44 required by this work item. getBuffer(String elementname), getDouble(String elementname), getLong(String elementname), getPriority(elementname), getString(String elementname), getUserID( ) and getValue(String) are various methods for accessing a data element by name and returning a value as a String. isValid( ) returns true if this object is valid for use.

The constructor is for use within client-side scripted pages (often identified by a filename extension jsp). Note that it does not take parameters from the WFMS 10 application program interface. Once the above methods are invoked to determine the particular activity user interface page 44 needed by the user to complete the identified work item, the WorkitemBean is made accessible to the URL for this request <226, 227, 228>.

Figure 19:
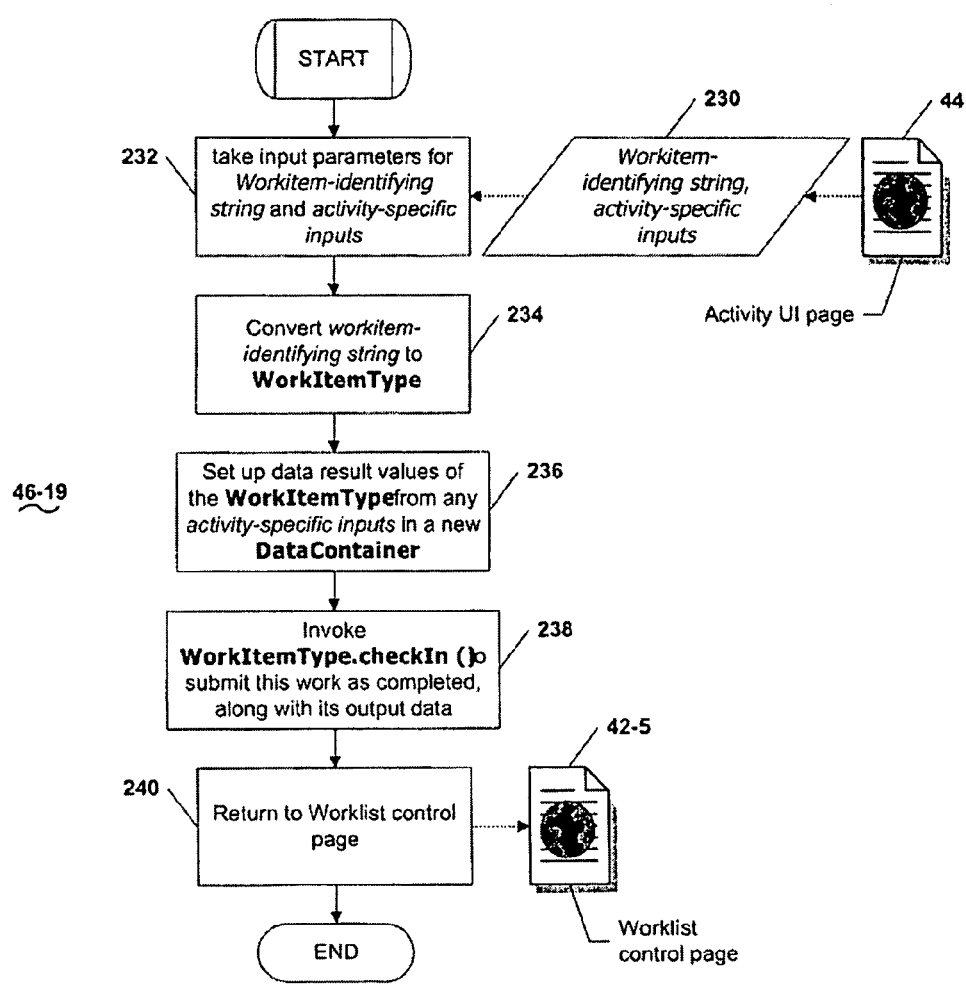
FIG. 19 is a flowchart detailing the structure, function and operation of a Check In servlet typically called by an activity user interface page described with respect to FIG. 15.

A user then enters whatever data is required by the activity user interface page 44 and, if the page includes a terminating command (such as a "Submit" button on a typical HTML <FORM>), the activity user interface page 44 calls the Check In servlet 46-19 (such as by an OnSubmit event handler on the HTML <FORM>). FIG. 19 is a flowchart detailing the structure, function and operation of the Check In servlet 46-19.

The activity user interface page 44 passes input parameters Workitem-identifying string and any activity-specific inputs <230, 232> to the servlet 46-19. The Check In servlet 46-19 converts the workitem-identifying string parameter to a WorkItemType class object <234> as described above with respect to the Activity servlet 46-18 in step <220>. The Check In servlet 46-19 sets up data result values of the WorkItemType object from any activity-specific inputs parameters <230> in a new DataContainer class <236>.

The DataContainer class is a "helper" class for use with Data Containers and servlets in that it simplifies setting an output container with the values from an HTML <FORM> submission.

Various methods are invokable in the DataContainer class. formatErrors( ) puts submission type mismatch errors into an HTML table and returns it. haserrors( ) returns true if there have been errors in processing the request. setOutput (HTTPServletRequest) takes values from the HTTPServletRequest and sets them to the matching fields of the data container.

The Check In servlet 46-19 invokes WorkItemType.checkIn( ) to submit this work as completed, along with its output data <238>. Navigation is then returned to the Worklist control page 42-5 <240>.

Figure 20:
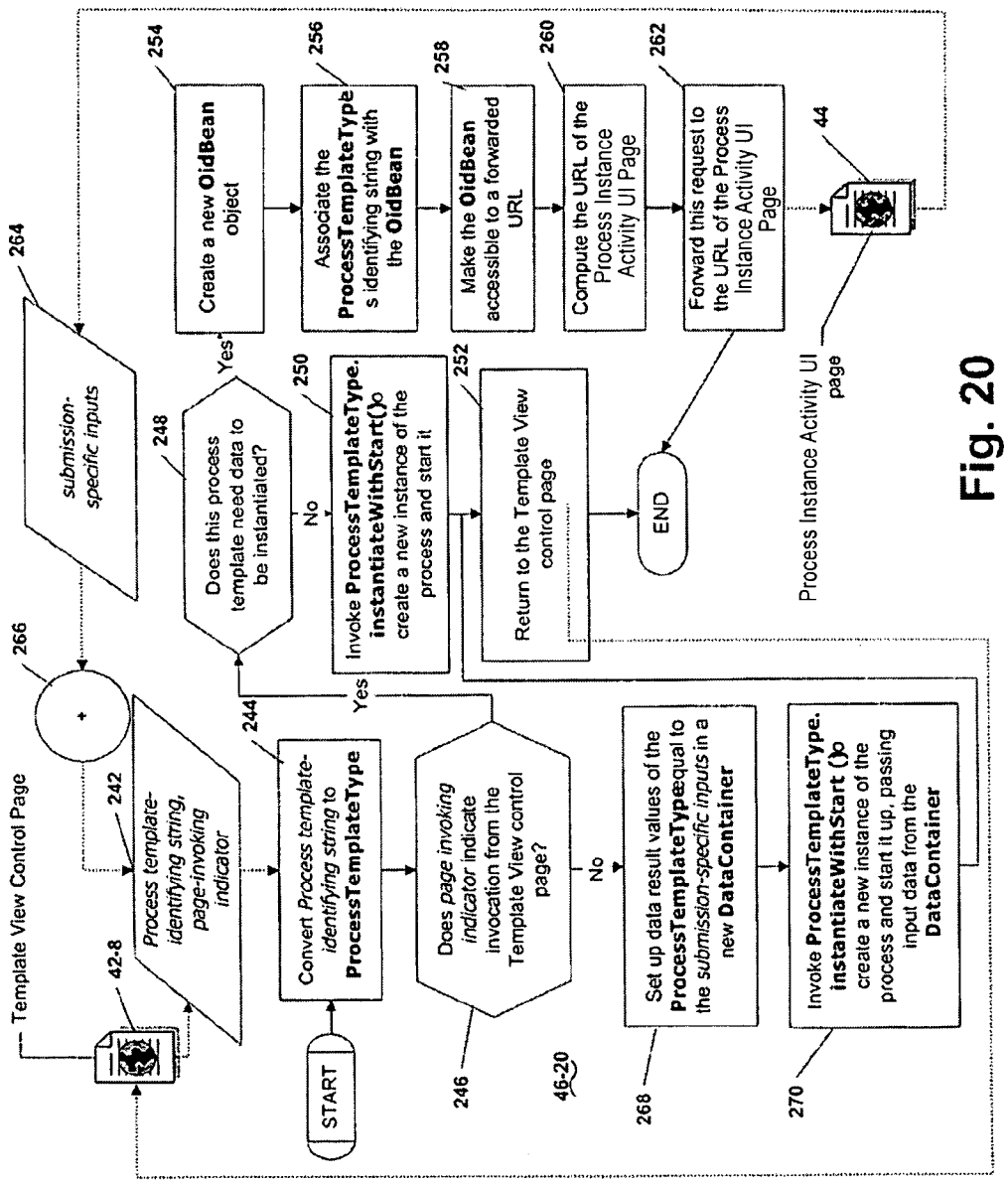
FIG. 20 is a flowchart detailing the structure, function and operation of a New Instance servlet typically called by the either the template view control page described with respect to FIG. 8 or an activity user interface page (not shown) specially designed and configured for supplying data for instantiating a new process instance with hypertext markup language.

FIGS. 17–19 generally describe the process by which a user accesses the functionality of the WFMS 10 through the interface 40 to log in, access a work item, identify the work to be performed, enter data via an administrator-defined activity user interface page 44 and update the WFMS 10 with the entered data. FIG. 20 describes the slightly more complicated procedure of instantiating a new process from a predefined process template in the WFMS 10.

FIG. 20 is a flowchart detailing the structure, function and operation of a New Instance servlet 46-20 typically called by the either the template view control page 42-8 described with respect to FIG. 8 or a process instance activity user interface page 44 specially designed and configured for supplying any needed data for instantiating a new process instance with hypertext markup language.

The New Instance servlet 46-20 is typically first invoked from a template view control page 42-8 which supplies input parameters of a process-template identifying string and a page-invoking indicator <242>.

The New Instance servlet 46-20 contemplates three possibilities for invocation of this page: First, the New Instance servlet 46-20 is called from the template view control page 42-8 and the process template-identifying string identifies a process template which requires no data to instantiate it. Second, the New Instance servlet 46-20 is called from the template view control page 42-8 and the process template-identifying string identifies a process template, which requires some data to instantiate it. In this second possibility, processing is eventually passed to a predefined activity user interface page 44 configured to accept data (such as in an HTTP <FORM>) after the appropriate data structures are initialized. Third, the New Instance servlet 46-20 is called from the process instance activity user interface page 44 (just called in the second possibility) to return the data entered by the user.

First, the New Instance servlet 46-20 converts the process template-identifying string (received at <242>) to a ProcessTemplateType class <244>. The ProcessTemplateType class acts as an interface that shows the public view of a process template as defined in the WFMS 10. A Process Template is an object that can be instantiated into a process instance as described above.

Various methods are invokable within the ProcessTemplateType class. instantiateWithStart( ) creates and runs a new instance of the process designated by this process template. instantiateWithStart(String) creates and runs a new instance of the process designated by String. name( ) returns the name of the Process Template. needsInputData( ) returns true if the template needs input data to be instantiated, false otherwise. toOid( ) returns the Process Template identifier object received from the WFMS 10 as an identifier in string form. The name of the instance is typically chosen arbitrarily by the WFMS 10.

Next, the New Instance servlet 46-20 determines whether it was invoked from the template view control page by examining the passed parameter page-invoking identifier <246>. If so, a process is being instantiated from the template view control page. The New Instance servlet 46-20 then determines whether the process needs data to be instantiated <248> (i.e., by determining whether the method call ProcessTemplateType.needsInputdata( ) returns true or false).

If the identified process template needs no data to be instantiated, the New Instance servlet invokes ProcessTemplateType.instantiateWithStart( ) to create a new instance of the process and start it up <250>. Navigation is returned to the Template View control page 42-8—the process is instantiated <252>. The New Instance servlet 46-20 ends.

Otherwise, the identified process template needs data to be instantiated, so the New Instance servlet 46-20 creates a new OidBean object <254> and associates the ProcessTemplateType's identifying string with the OidBean <256> so the instantiated process has its identifier. The OidBean object is made accessible to a forwarded URL <258>. The URL of the Process Instance Activity UI Page 44 is computed to determine the target page where the needed data will be entered by a user <260> and navigation jumps to the targeted page <262>.

The user then enters the data into the targeted Process Instance Activity UI Page 44 and terminates the data entry in a conventional fashion (such as by pressing a "Submit" button on an administrator designed HTML <FORM>).

The data entered by the user in the targeted Process Instance Activity UI Page 44 is returned to the New Instance Servlet with new parameters <264> containing the submission-specific inputs from the Process Instance Activity UI Page 44. These parameters <264> are added <266> to the previously submitted parameters <242> with the page-invoking indicator now signaling invocation by a Process Instance Activity UI Page 44.

Processing continues in the New Instance servlet 46-20 through steps <244> and <246> again. However, this time, since the page-invoking identifier now indicates invocation from an activity user interface page 44 rather than the template control page, processing continues to step <268> where the data result values of the ProcessTemplateType from the submission-specific inputs in a new DataContainer <268>. ProcessTemplateType.instantiateWithStart( ) is then invoked to create a new instance of the process and start it up, passing input data from the DataContainer <270>. Processing then passes to <252> to forward the request to the Template View control page 42-8.

In summary, WFSessionType encapsulates a log on session via the Log On servlet 46-17 and important functions associated therewith. The most important methods are connect( ) and disconnect.

The ProcessTemplateType class (technically a Java interface) is used in the New Instance servlet 46-20 that creates new process instances.

The WorkItemType class (technically a Java interface) is used in the servlets 46-18 and 46-19 that check out a work item for processing and check it back in when the user is finished.

The WorkitemBean class is used in the activity UI pages 44 to access data of a work item via the method getValue.

The ListData class is used by most of the control pages to get their data from the WFMS 10, e.g., the worklist page gets the list of work items from this class.

As was previously described, the interface 40 also includes activity user interface pages 44, which are custom-designed HTML pages for inputting external data, needed to invoke certain activities in a process instance. An example of an activity user interface page 44 is shown by example in FIG. 15. These activity user interface pages 44 are contemplated as being designed by the administrator of the WFMS 10 and can include text boxes, radio buttons or other HTML <FORM>-based controls for receiving information from a user needed to initiate a process instance or complete a worklist task item.

These activity user interface pages 44 can be designed with simple HTML code using well-known input form techniques such as with the <FORM></FORM> and <INPUT></INPUT> tags. The entered information is then sent, typically after a user clicks a submit-type button, to a control page by specifying an ACTION location in the <FORM> HTML tag.

There are several advantages to the web-based interface 30 for a workflow management system 10 as described herein. Users of the WFMS 10 have easy and intuitive access to the functionality of the WFMS 10, e.g., items in a workflow definition are provided as one-click links to invoke new items. Users have easy access to underlying workflow functionality, such as convenient sorting and filtering of workflow items, previously unavailable in web-based interfaces for a WFMS 10.

Administrators can easily customize the web-based interface 30 for a WFMS 10 because the interface 30 was created using open source server-side pages, programmed using, by example, Javascript (JSPs). The server-side Java code is embedded into the HTML defining the control pages. Much of the presentation features of the web-based interface 40, such as in the control pages 42 can be easily modified using any well-known HTML editor to suit the administrator of a particular installation with minimal Java programming.

The servlets/custom classes 46 which access the underlying functionality of the particular WFMS 10 adapt the control pages to work with different types of WFMS 10 allowing portability between different WFMS 10 platforms without interrupting the visual appearance and operation of the interface 40 available to the users.

The interaction of the inventive predefined servlets with administrator-defined activity user interface pages 44 is as follows: First, an end-user of the web client 34 initiates the request to work on a given work item. This is either through clicking on a link in the worklist table __ under the "Name" column, or by pressing the Re-Run button in a work item control page 42-14 for a work item whose activity had already been started. These behaviors both issue an HTTP request to the Activity servlet 46-18. As part of the request, two data items are passed along.

One data item identifies the activity user interface page 44 that contains the form to invoke as part of completing the activity, identified via a standard URL.

A simple convention for determining the URL of the target page was determined by the inventors hereof: the target URL is determined by the ListData class during the formatting of the worklist table by combining the name of the work item with the web path information that was supplied in a configuration file of the web client. The other piece of data identifies the work item on which the user is requesting to work. Depending on the underlying WFMS 10 used with the web client 34, this can be a stringified form of a program object reference, or session information that can be serialized and later replayed to retrieve such a reference to a programmatic workflow object. In the implementation herein, a stringified form of a program object reference is used.

The Activity servlet 46-18 creates an object of the WorkItemType class from the passed-in information and the workflow information of the HTTP session (WFSesssionType). WorkItemType encapsulates the functionality of work item objects in the WFMS 10. The Activity servlet invokes a method on the WorkItemType object to reserve or "check out" the work item for use by the current connected user of the WFMS 10; an operation or set of operations is expected to exist in the WFMS 10 that allows this type of conventional record locking. The Activity servlet 46-18 then prepares to forward the HTTP request to the activity UI page 44 that comprises the data-entry part of the activity of the work item.

The preparation done to the WorkItemType object before forwarding it on is to add to the request an object, accessible to the activity user interface page 44, that can access input data of the invoked activity. This data may be earmarked for just this activity or it may be globally available to multiple activities of the WFMS 10. The type of this request object, one of the inventive classes herein, is WorkItemBean whereby use of the WorkItemBean object within activity user interface pages 44 creates their dynamic content.

Output data is set, namely, by matching the name of known WFMS 10 output data fields to input fields of the form in the JSP file that is submitted.

The action in the HTML <FORM> in the activity user interface page lists the URL of the Check In servlet 46-19. Upon a form submission that requests to complete the activity, the Check In servlet tries to use the data values set in the request <FORM> as output data of the activity, and informs the WFMS 10, through use of the custom class WorkItemType, that this activity has finished.

If the request was instead to cancel the activity, the servlet undoes the "check out" operation performed by the Activity servlet prior to displaying the activity user interface page 44. After performing these operations the Check In servlet 46-19 brings the user back to the worklist control page 42-5.

An example of how to customize the web-based interface 30 according to these conventions will now be described. The following steps would preferably be performed at the customer's location by a network administrator who is incorporating the web-based interface 30 into the networked environment generally having the components of FIG. 2.

The WFMS 10 typically has processes defined from a "build-time" configuration (a set-up program provided with the WFMS 10) and imported into "run-time" (the actual operational use of the WFMS 10). The network administrator "web-enables" these processes from the interface 40 as described herein.

To web-enable WFMS 10 processes, the administrator defines web pages (the activity user interface pages 44) to correspond to activities that are invokable through the web-based interface 40. The activity user interface pages 44 will typically always have an HTML <FORM> in them which the user submits to complete (or cancel) the desired activity for each web-enabled activity of the WFMS 10.

If the process is defined in build-time within the WFMS 10 to take input data from a data source, then the administrator can also define a process instance user interface page 44 with a <FORM> to submit upon startup of a process instance.

A convention for locating and naming files within the interface is provided herein as well. The activity user interface pages 44 are located in a directory beneath a subdirectory containing the processes in the distribution. The name of the directory is the name of the process template. For example, the full path to a processes directory can be:

D:\InetPub\wwwroot\gte\wfms\processes

A process name can be called MyProcess. A directory

D:\InetPub\wwwroot\gte\mqwf\processes\MyProcess is created therebeneath where the activity user interface files 44 will be placed. If MyProcess is defined to take input from a data source when it begins, the administrator will create a file MyProcess.jsp and put it in the processes directory, not in the MyProcess subdirectory (i.e., the difference between the activity user interface files 44 placed within the MyProcess directory and the process instance activity user interface file 44 placed in the same directory as the MyProcess.jsp. page).

To name the activity user interface files 44, they are named the as the activity names, but with a .jsp extension. There is one file 44 per activity being implemented. Activity user interface files 44 do not need to be created for every activity in the process, just the activities that are to be web enabled under the interface 40.

For example, an activity named Activity1 is to be invokable through the web-based interface 40. A file named Activity1.jsp is created in the directory for the process.

The preferred HTML file format for these types of files will now be described. To create a file to use upon starting a process (i.e., it might be necessary because that process is defined to take input from a data source), a .jsp file is created composed mostly in HTML, which has certain required elements (jsp and HTML).

At the top of the file, the following tags are inserted:
<%@ page errorPage="instantiation_error.jsp" import="com.gte.p1900.wf.WebConfig" %>
<jsp:useBean id="bean" scope="request" class="com.gte.p1900.wf.OidBean"/>

Then, an HTML form is placed in the body of this file. For example:
<FORM
ACTION="<%=WebConfig.getNewInstanceServlet String ( ) %>" METHOD="POST">

This tag can be modified by adding a NAME attribute, for use by javascript code or another purpose. The form should have one hidden input element that passes the identity of the process template to the servlet the form is submitted to:
<INPUT TYPE="HIDDEN" NAME="*oid*" VALUE="<%=bean.getoid ( ) %>">

The other required input elements in the form are submit and cancel values, which can be implemented with SUBMIT inputs or buttons:
<INPUT TYPE="SUBMIT" NAME="*continue*" VALUE="Continue">
<INPUT TYPE="SUBMIT" NAME="*continue*" VALUE="Cancel">

The form is then closed per proper HTML syntax with </FORM>.

Typically, an administrator will want to include some fields in the <FORM> described above for inputting data to the process. All other input fields in the form will be treated as data for the input container of the process.

For example, there is to be a field in the input data container named "FirstName" that the administrator desires a user to complete every time the form is completed. The administrator completes the appropriate form input element and names it the same as the element in the data container. For example:
<INPUT TYPE="TEXT" NAME="FirstName" SIZE=30>

When the form is submitted, the value of this field will be set to the value of the "FirstName" element in the data container. Typically, the administrator should add one form input element for each data container element to be set.

There is also a special form input element an administrator can use to name the process instance that is being created.

This is optional; if this input element is not used then the name of the process instance can often be generated automatically by the WFMS 10.

To use this input element, add an input element to the form named "*instanceName*". For example:
    <INPUT TYPE="TEXT" NAME="*instanceName*" SIZE=30>

Of course, the administrator can use some scripting as desired to have the instance name computed from a different part of the form instead of directly entered into a field by the user.

The format of activity user interface files 44 will now be described which are similar in form to a process-instance activity user interface file 44. The administrator uses embedded java code to access input container data, and form input fields are used to set output container data.

At the top of each Activity UI file, the following tags should be inserted:
    <%@ page errorPage="ui_error.jsp" import="com.gte.p1900.wf.WebConfig" %>
    <jsp:useBean id="item" scope="request" class="com.gte.p1900.wf.WorkitemBean"/>

The top tag includes a reference to a file ui_error.jsp, which is a default redirection page for errors. The use of the errorPage attribute is optional and can be removed altogether.

Anywhere the administrator wants a user to access input data, it must place an embedded java expression within the user interface page 44. For example, to access an input data element named "FirstName":
    <%=item.getValue("FirstName") %>

In the HTML code that is sent back to the client, this expression will be replaced by the value from the input data container. The code inside <%= . . . %> (as is well known in client-side scripting convention) can occur anywhere in the HTML source. For example:
    <B><I><FONT COLOR="#3333FF" SIZE=+2><%=item.getValue("FirstName") %><%=item.getValue("LastName") %> requests a Credit.</FONT></I></B>

The administrator's activity user interface file 44 will contain a form, the submission of which indicates completion (or cancellation) of a desired activity. To set output data, form input elements are included whose names match names in the output data container. The form should start with a tag like:
    <FORM ACTION="<%=webConfig.getCheckinServletString( ) %>" METHOD="POST">

Optionally, the administrator can add a NAME=" . . . . " attribute to the FORM tag. The following hidden input field must be included in the form:
    <INPUT TYPE="hidden" NAME="*oid*" VALUE="<%=item.getoid( ) %>">

This input field identifies the associated work item object for the activity to the servlet that handles the submission of the form.

Output data can be set with input fields in the form, which can be hidden or displayed. Example:
    <INPUT TYPE="TEXT" NAME="CreditAmount" SIZE=15>

Here, CreditAmount is an element in the output container. If the administrator's desired output container has a user-defined structure, use dot notation to access the leaf element of the structure to be set, e.g.:
    <INPUT TYPE="TEXT" NAME="Loan.CreditAmount" SIZE=15>

If the administrator desires to enforce type restrictions on inputs, such as the CreditAmount field above should be restricted to a floating point number, javascript code can be added to the HTML page to accomplish this. The servlet where the submission goes will also check for type matches and return a predefined table of errors if the types don't match.

The form should include an input value called "*continue*" whose value is either "Submit" or "Cancel". The administrator can do this with the SUBMIT input type or buttons:
    <INPUT TYPE="SUBMIT" NAME="*continue*" VALUE="Submit">
    <INPUT TYPE="SUBMIT" NAME="*continue*" VALUE="Cancel">

The administrator writes the rest of the HTML to help the user complete the activity.

Essentially, the invention pertains to a standard interface for accessing workflow management software packages using a web browser with standardized control pages, which can be implemented, at a particular location while requiring minimal customization or programming of the web pages.

In accordance with the provisions of the patent statutes, the principle and mode of operation of this invention have been explained and illustrated in several preferred embodiments. However, it must be understood that this invention may be practiced otherwise than as specifically explained and illustrated without departing from its spirit and scope.

What is claimed is:

1. A flexible interface employing a client program interconnected to a client server which, in turn, is operably networked to a workflow server running a workflow management system having workflow-type functionality including a set of predefined process templates defining a set of tasks and being capable of monitoring workflow, assigning tasks to users, and allowing users to initiate instances of a process from one of the set of predefined process templates, the interface comprising:

at least one first workflow platform-dependent object for accessing the workflow functionality, wherein the at least one first workflow platform-dependent object is customized for the workflow management system;

at least one second workflow platform-independent object for providing input data received from the client server to the at least one first workflow platform dependent object and to receive output data provided by the workflow management system from the at least one first workflow platform dependent object;

a set of predefined protocol user interface pages comprising at least one control page with said predefined protocol having at least one invocation to the at least one second object embedded therein; and at least one server program callable by the at least one control page and adapted to invoke at least one of the first workflow platform-dependent object and the at least one second workflow platform-independent object;

wherein, when the functionality of the workflow management system is to be accessed via the set of predefined protocol user interface pages, the at least one control page calls the at least one server program which, in turn, invokes at least one of the first and second objects to promote data translation and exchange between the client program and the workflow management system.

2. The flexible interface of claim 1 wherein the server program further comprises a Log On servlet for receiving a user identification variable and a password variable from one of the set of predefined protocol pages and invoking at least one of the first and second objects to authenticate the user identification variable with the workflow management system.

3. The flexible interface of claim 2 wherein the server program further comprises an Activity servlet for receiving a work item identification and a target user interface address from the at least one control page, and invoking at least one of the first and second objects to record lock a task in the workflow management system corresponding to the work item identification and permit exclusive access by a user to the task identified by the work item identification by checking out the task to the user for the user to work on the task.

4. The flexible interface of claim 3 wherein the Activity servlet further comprises a redirection command for navigating the user to a predefined protocol page represented by the target user interface address for performing work on the task identified by the work item identification.

5. The flexible interface of claim 4 wherein the server program further comprises a Check In servlet for receiving a work item identification from one of an activity user interface page and the at least one control page, and invoking at least one of the first and second objects to release a record lock on a task in the workflow management system corresponding to the work item identification and terminate any exclusive access by a user to work on the task identified by the work item identification.

6. The flexible interface of claim 5 wherein the Check In servlet further receives task-specific data from a requesting page and further comprises a database update command for updating the task identified by the work item identification with the task-specific data.

7. The flexible interface of claim 6 wherein the server program further comprises a New Instance servlet for receiving a predefined process template identification from the at least one control page, and invoking at least one of the first and second objects to initiate a new instance of a process template in the workflow management system corresponding to the process template identification, wherein the new instance of the process template defines a specific set of tasks.

8. The flexible interface of claim 7 wherein the New Instance servlet determines whether input data is needed to initiate the new instance of the predefined process template and the interface further comprises a user interface page face wherein the New Instance servlet redirects the user to the user interface page to further receive input data to properly initiate the new instance of the process template with the input data.

9. The flexible interface of claim 8 and further comprising at least one predefined protocol user interface page adapted to receive at least one data variable from the user and to call the at least one server-based applet.

10. The flexible interface of claim 9 wherein the user interface page further comprises at least one <FORM> tag having at least one input element for receiving data from the user.

11. The flexible interface of claim 10 wherein the user interface page is adapted to provide at least one data variable to initiate a process template into a running process that requires the data entry for instantiation.

12. The flexible interface of claim 11 wherein the user interface page is adapted to provide at least one data variable to complete a task from a previously initiated process that requires the data entry for completion.

13. The flexible interface of claim 12 wherein the first and second objects are Java classes.

14. The flexible interface of claim 13 wherein the first object is implemented in terms of the workflow-type functionality of the workflow management system.

15. The flexible interface of claim 14 wherein the at least one control page comprises a worklist page, a process instance page, a process template page, a work item control page, a filter control page, and a notifications page.

16. The flexible interface of claim 14 wherein the client program is a web browser and the client server is a web server.

17. The flexible interface of claim 1 wherein the server program further comprises an Activity servlet for receiving a work item identification and a target user interface address from the at least one control page, and invoking at least one of the first and second objects to record lock a task in the workflow management system corresponding to the work item identification and permit exclusive access by a user to the task identified by the work item identification by checking out the task to the user for the user to work on the task.

18. The flexible interface of claim 17 wherein the Activity servlet further comprises a redirection command for navigating the user to a predefined protocol page represented by the target user interface address for performing work on the task identified by the work item identification.

19. The flexible interface of claim 1 wherein the server program further comprises a Check In servlet for receiving a work item identification from the at least one control page, and invoking at least one of the first and second objects to release a record lock on a task in the workflow management system corresponding to the work item identification and terminate any exclusive access by a user to work on the task identified by the work item identification.

20. The flexible interface of claim 19 wherein the Check In servlet further receives task-specific data from a requesting page and further comprises a database update command for updating the task identified by the work item identification with the task-specific data.

21. The flexible interface of claim 1 wherein the server program further comprises a New Instance servlet for receiving a predefined process template identification from the at least one control page, and invoking at least one of the first and second objects to initiate a new instance of a process template in the workflow management system corresponding to the process template identification, wherein the new instance of the process template defines a specific set of tasks.

22. The flexible interface of claim 21 wherein the New Instance servlet determines whether input data is needed to initiate the new instance of the predefined process template and the interface further comprises a user interface page face wherein the New Instance servlet redirects the user to the user interface page to further receive input data to properly initiate the new instance of the process template with the input data.

23. The flexible interface of claim 1 and further comprising at least one predefined protocol user interface page adapted to receive at least one data variable from the user and to call the at least one server-based applet.

24. The flexible interface of claim 23 wherein the user interface page further comprises at least one <FORM> tag having at least one input element for receiving data from the user.

25. The flexible interface of claim 24 wherein the user interface page is adapted to provide at least one data variable to initiate a process template into a running process that requires the data entry for instantiation.

26. The flexible interface of claim 25 wherein the user interface page is adapted to provide at least one data variable to complete a task from a previously initiated process that requires the data entry for completion.

27. The flexible interface of claim 1 wherein the first and second objects are Java classes.

28. The flexible interface of claim 1 wherein the Java class comprises a Java interface class.

29. The flexible interface of claim 1 wherein the at least one control page comprises a worklist page, a process instance page, a process template page, a work item control page, a filter control page, and a notifications page.

30. The flexible interface of claim 1 wherein the client program is a web browser and the client server is a web server.

31. The flexible interface of claim 1 wherein the set of predefined protocol user interface pages further comprises a filter page for receiving filter parameters and invoking at least one of the first and second objects to filter a work list with the workflow management system.

32. A method for employing a flexible interface of a client program interconnected to a client server to access the functionality of a workflow management system operably networked to a workflow server, the functionality including a set of predefined process templates defining a set of tasks and being capable of monitoring workflow, assigning tasks to users, and allowing users to initiate instances of a process from one of the set of predefined process templates, the method comprising the steps of:
configuring a set of predefined protocol user interface pages comprising at least one control page with said predefined protocol having at least one server-side script embedded therein;
pointing at least one first workflow platform-dependent object to access the workflow functionality, wherein the at least one first workflow platform-dependent object is customized for the workflow management system;
interfacing at least one second workflow platform independent object with the at least one first workflow platform dependent object, wherein the at least one second workflow platform independent object is configured to provide input data received from the client server to the at least one first workflow platform dependent object and to receive output data provided by the workflow management system from the at least one first workflow platform dependent object; and
calling at least one server program with the at least one control page which thereby invokes at least one of the first workflow platform-dependent object and the at least one second workflow platform-independent object;
wherein, when the functionality of the workflow management system is to be accessed via the set of predefined protocol user interface pages, the at least one control page calls the at least one server program which, in turn, invokes at least one of the first and second objects to promote data translation and exchange between the client program and the workflow management system.

33. The method of claim 32 and further comprising the step of logging a user on to the workflow management system via one of the set of predefined protocol pages, receiving a user identification variable and a password variable therefrom, and invoking at least one of the first and second objects to authenticate the user identification variable with the workflow management system.

34. The method of claim 33 and further comprising the step of receiving a work item identification and a target user interface address from the at least one control page; and invoking at least one of the first and second objects to record lock a task in the workflow management system corresponding to the work item identification and permit exclusive access by a user to the task identified by the work item identification by checking out the task to the user for the user to work on the task.

35. The method of claim 34 and further comprising the step of issuing a redirection command to cause a predefined protocol page represented by the target user interface address to be presented to the user for performing work on the task identified by the work item identification.

36. The method of claim 35 and further comprising the step of receiving a work item identification from the at least one control page and invoking at least one of the first and second objects to release a record lock on a task in the workflow management system corresponding to the work item identification and terminate any exclusive access by a user to work on the task identified by the work item identification.

37. The method of claim 36 and further comprising the step of receiving task-specific data from a requesting page and updating the task identified by the work item identification with the task-specific data in the workflow management system.

38. The method of claim 37 and further comprising the step of receiving a predefined process template identification from the at least one control page, and invoking at least one of the first and second objects to initiate a new instance of a process template in the workflow management system corresponding to the process template identification, wherein the new instance of the process template defines a specific set of tasks.

39. The method of claim 38 and further comprising the step of determining whether input data is needed to initiate the new instance of the predefined process template.

40. The method of claim 39 and further comprising the step of redirecting the user to a user interface page to receive required input data to properly initiate the new instance of the process template with the input data if the determining step results in a determination that data is needed to initiate the process instance.

41. The method of claim 40 and further comprising the step of redirecting the user from the user interface page back to the New Instance servlet to update the workflow management system with the received input data to initiate the process instance.

42. The method of claim 41 and further comprising at least one predefined protocol user interface page adapted to receive at least one data variable from the user and to call the at least one server based applet.

43. The method of claim 42 wherein the user interface page further comprises at least one <FORM> tag having at least one input element for receiving data from the user.

44. The method of claim 43 wherein the user interface page is adapted to provide at least one data variable to initiate a process template into a running process that requires the data entry for instantiation.

45. The method of claim 44 wherein the user interface page is adapted to provide at least one data variable to complete a task from a previously initiated process that requires the data entry for completion.

46. The method of claim 45 wherein the first and second objects are Java classes.

47. The method of claim 46 wherein the Java class comprises a Java interface class.

48. The method of claim 46 wherein the at least one control page comprises a worklist page, a process instance page, a process template page, a work item control page, a filter control page, and a notifications page.

49. The method of claim 46 wherein the client program is a web browser and the client server is a web server.

50. The method of claim 32 and further comprising the step of receiving a work item identification and a target user interface address from the at least one control page; and invoking at least one of the first and second objects to record lock a task in the workflow management system corresponding to the work item identification and permit exclusive access by a user to the task identified by the work item identification by checking out the task to the user for the user to work on the task.

51. The method of claim 50 and further comprising the step of issuing a redirection command to cause a predefined protocol page represented by the target user interface address to be presented to the user for performing work on the task identified by the work item identification.

52. The method of claim 32 and further comprising the step of receiving a work item identification from the at least one control page and invoking at least one of the first and second objects to release a record lock on a task in the workflow management system corresponding to the work item identification and terminate any exclusive access by a user to work on the task identified by the work item identification.

53. The method of claim 52 and further comprising the step of receiving task-specific data from a requesting page and updating the task identified by the work item identification with the task-specific data in the workflow management system.

54. The method of claim 32 and further comprising the step of receiving a predefined process template identification from the at least one control page, and invoking at least one of the first and second objects to initiate a new instance of a process template in the workflow management system corresponding to the process template identification, wherein the new instance of the process template defines a specific set of tasks.

55. The method of claim 54 and further comprising the step of determining whether input data is needed to initiate the new instance of the predefined process template.

56. The method of claim 55 and further comprising the step of redirecting the user to a user interface page to receive required input data to properly initiate the new instance of the process template with the input data if the determining step results in a determination that data is needed to initiate the process instance.

57. The method of claim 56 and further comprising the step of redirecting the user from the user interface page back to the New Instance servlet to update the workflow management system with the received input data to initiate the process instance.

58. The method of claim 32 and further comprising at least one predefined protocol user interface page adapted to receive at least one data variable from the user and to call the at least one server-based applet.

59. The method of claim 58 wherein the user interface page further comprises at least one <FORM> tag having at least one input element for receiving data from the user.

60. The method of claim 58 wherein the at least one user interface page is adapted to provide at least one data variable to initiate a process template into a running process that requires the data entry for instantiation.

61. The method of claim 58 wherein the user interface page is adapted to provide at least one data variable to complete a task from a previously initiated process that requires the data entry for completion.

62. The method of claim 32 wherein the first and second objects are Java classes.

63. The method of claim 62 wherein the Java class comprises a Java interface class.

64. The method of claim 32 wherein the at least one control page comprises a worklist page, a process instance page, a process template page, a work item control page, a filter control page, and a notifications page.

65. The method of claim 32 wherein the client program is a web browser and the client server is a web server.

66. The method of claim 32 and further comprising the steps of:
   directing the user to a user interface filter page;
   receiving filter parameters via the user interface filter page;
   invoking at least one of the first and second objects to filter a work list with the workflow management system.

67. A method for organizing and locating and navigating users within a flexible interface of a client program interconnected to a client server having a predefined interface root directory path to access the functionality of a workflow management system operably networked to a workflow server, the functionality including a set of predefined process templates each having a unique process identifier and defining a set of tasks and being capable of monitoring workflow, assigning tasks to users each having a unique task identifier, and allowing users to initiate instances of a process from one of the set of predefined process templates, the method comprising the steps of:
   creating at least one predefined protocol process activity page relating to a process and named for the unique process identifier, wherein the process corresponds with a function of the workflow management system and defines one or more tasks, the workflow management system being configured to assign the tasks to users and to monitor work performed on the tasks;
   locating the at least one predefined protocol process activity page in the predefined interface root directory path;
   creating a process directory beneath the predefined interface root directory path for the process and named for the unique identifier thereof;
   creating at least one predefined notifications view control page within the created process directory in a predetermined protocol relating to a task assignable within the process and named for the task unique identifier if the task requires completion by a designated deadline the at least one predefined notification view control page being configured to be issued when the task is not completed by the designated deadline;
   locating the at least one predefined notifications view control page in the created directory within the predefined interface root directory path;
   creating at least one predefined protocol user interface page within the created process directory in a predetermined protocol relating to a task assignable within the process and named for the task unique identifier if the process requires input on any of its assignable activities;
   locating the at least one predefined protocol user interface page in the created directory within the predefined interface root directory path; and whereby the predefined protocol process activity page can be automatically located by the interface within the predefined interface root directory path of the client server by only knowing the process unique identifier and the at least one predefined protocol user interface page can be located in the created directory within the predefined interface root directory path by knowing only the task unique identifier.

68. The method of claim 67 and further comprising the step of embedding a form within the at least one user interface page in the predefined protocol configured so as to provide any required data to the assignable task into the workflow management system.

69. The method of claim 68 wherein the form contains input prompts configured so as to provide specific data in a machine readable format to the workflow management system.

70. The method of claim 69 and further comprising the step of embedding a hidden field on the at least one user interface page containing the unique process identifier for cross-referencing the data within the at least one user interface page with the workflow management system.

71. The method of claim 70 wherein the predefined protocol comprises at least one of HTML and javascript.

72. The method of claim 68 and further comprising the step of defining a programming object for use as an input container for delivering data entered by a user on the at least one user interface page.

* * * * *